(12) United States Patent
Wertsberger

(10) Patent No.: US 10,908,431 B2
(45) Date of Patent: Feb. 2, 2021

(54) NANO-SCALE CONICAL TRAPS BASED SPLITTER, COMBINER, AND REFLECTOR, AND APPLICATIONS UTILIZING SAME

(71) Applicant: Shalom Wertsberger, Rochester, NY (US)

(72) Inventor: Shalom Wertsberger, Rochester, NY (US)

( * ) Notice: Subject to any disclaimer, the term of this patent is extended or adjusted under 35 U.S.C. 154(b) by 820 days.

(21) Appl. No.: 15/607,678

(22) Filed: May 29, 2017

(65) Prior Publication Data

US 2017/0351102 A1    Dec. 7, 2017

Related U.S. Application Data

(60) Provisional application No. 62/346,123, filed on Jun. 6, 2016.

(51) Int. Cl.
*G02B 27/10* (2006.01)
*G02B 27/00* (2006.01)
(Continued)

(52) U.S. Cl.
CPC ......... *G02B 27/1006* (2013.01); *G02B 6/107* (2013.01); *G02B 6/12011* (2013.01);
(Continued)

(58) Field of Classification Search
CPC ................ G02B 27/1006; G02B 27/0087; G02B 6/107; G02B 6/12011; G02B 6/12014;
(Continued)

(56) References Cited

U.S. PATENT DOCUMENTS 2,433,368 A    12/1947    Johnson et al.
2,992,587 A    7/1961    Hicks, Jr. et al.
(Continued)

FOREIGN PATENT DOCUMENTS

DE    4409698    3/1994
EP    1221760    7/2002
(Continued)

OTHER PUBLICATIONS

"Plasmonic Rainbow Trapping Structures for Light Localization and Spectrum Splitting" Min Seok Jang and Harry Atwater, Physical Review Letters 107, 207401 (2011), Nov. 11, 2011, American Physical Society.
(Continued)

*Primary Examiner* — Thomas K Pham
*Assistant Examiner* — Mitchell T Oestreich
(74) *Attorney, Agent, or Firm* — Shalom Wertsberger; Saltamar Innovation

(57) ABSTRACT

Tapered cavity structures disposed within a stratum may be configured as a spectral component splitters, a spectral component combiners, and various combinations thereof including a reflective mode of operation. The tapered cavities have an aperture at their wider and a tip at the narrower, and are dimensioned such that multi-spectral radiant energy admitted into the cavity via the aperture would depart the tapered cavity via its side periphery at a depth and/or direction dependent on its frequency and/or its polarization, and that a plurality of spectral components admitted to the cavities via the its peripheral side or sides will be mixed and emitted via the aperture. Reflective type structures where portions of radiant energy is selectively absorbed and other portions are reflected are also considered. Differing stratums are disclosed. Applications of the tapered cavities in a stratum are also disclosed.

20 Claims, 10 Drawing Sheets

(51) Int. Cl.
| | | |
|---|---|---|
| *G02B 6/10* | (2006.01) | |
| *G02B 6/12* | (2006.01) | |
| *G02B 6/122* | (2006.01) | |
| *G02B 6/293* | (2006.01) | |

(52) U.S. Cl.
CPC ....... *G02B 6/12014* (2013.01); *G02B 6/1228* (2013.01); *G02B 6/293* (2013.01); *G02B 27/0087* (2013.01); *G02B 6/29304* (2013.01)

(58) Field of Classification Search
CPC ... G02B 6/1228; G02B 6/293; G02B 6/29304
USPC ........................................................ 359/577
See application file for complete search history.

(56) References Cited

U.S. PATENT DOCUMENTS

| | | | |
|---|---|---|---|
| 3,310,439 | A | 3/1967 | Seney |
| 3,422,527 | A | 1/1969 | Gault |
| 4,076,378 | A | 2/1978 | Cole |
| 4,251,679 | A | 2/1981 | Zwan |
| 4,332,973 | A | 6/1982 | Sater |
| 4,358,770 | A | 11/1982 | Satoh |
| 4,409,422 | A | 10/1983 | Sater |
| 4,496,876 | A | 1/1985 | Young |
| 4,680,558 | A | 7/1987 | Gosh et al. |
| 4,842,357 | A | 6/1989 | Doneen |
| 4,923,276 | A | 5/1990 | Wells |
| 4,932,032 | A | 6/1990 | Koch et al. |
| 5,060,119 | A | 10/1991 | Parthasarathy |
| 5,192,863 | A | 3/1993 | Kavehrad et al. |
| 5,343,542 | A | 8/1994 | Kash et al. |
| 5,375,178 | A | 12/1994 | Van Der Tol |
| 5,526,449 | A | 6/1996 | Meade et al. |
| 5,784,507 | A | 7/1998 | Holm-Kennedy |
| 5,923,795 | A | 7/1999 | Toyohara |
| 6,151,427 | A | 11/2000 | Satorius |
| 6,313,434 | B1 | 11/2001 | Patterson |
| 6,328,932 | B1 | 12/2001 | Carter |
| 6,374,024 | B1 | 4/2002 | Ijima |
| 6,628,242 | B1 | 9/2003 | Hacker et al. |
| 6,819,861 | B2 | 11/2004 | Ota |
| 6,858,828 | B2 | 2/2005 | Roy et al. |
| 6,919,862 | B2 | 7/2005 | Hacker |
| 6,992,639 | B1 | 1/2006 | Lier |
| 7,220,035 | B2 | 5/2007 | Buelow |
| 7,397,977 | B2 | 7/2008 | Hashimoto et al. |
| 7,483,615 | B2 | 1/2009 | Mihailove et al. |
| 7,526,167 | B1 | 4/2009 | Minelly |
| 7,623,745 | B2 | 11/2009 | Podolski et al. |
| 7,799,988 | B2 | 9/2010 | Cutler |
| 7,902,453 | B2 | 3/2011 | Dutta |
| 7,943,847 | B2 | 5/2011 | Kempa et al. |
| 7,999,174 | B2 | 8/2011 | Moslehi |
| 8,012,382 | B2 | 9/2011 | Kim et al. |
| 8,547,639 | B2 | 11/2013 | Watanabe |
| 8,594,476 | B2 | 11/2013 | Shkunov |
| 9,348,078 | B2 | 5/2016 | Layton et al. |
| 2002/0070350 | A1 | 6/2002 | Rushbrook |
| 2003/0161374 | A1* | 8/2003 | Lokai ................. G03F 7/70025 372/57 |
| 2004/0071180 | A1 | 4/2004 | Wang |
| 2005/0007289 | A1 | 1/2005 | Zarro et al. |
| 2005/0018272 | A1 | 1/2005 | Kimura |
| 2005/0029536 | A1 | 2/2005 | Sugitatsu |
| 2005/0041924 | A1 | 2/2005 | Bouadma et al. |
| 2005/0207699 | A1 | 9/2005 | Painter et al. |
| 2006/0098918 | A1 | 5/2006 | Noda et al. |
| 2007/0063791 | A1 | 3/2007 | Wu et al. |
| 2007/0076481 | A1 | 4/2007 | Tennant |
| 2007/0116975 | A1 | 8/2007 | Mihailov |
| 2008/0047601 | A1 | 2/2008 | Nag et al. |
| 2008/0210294 | A1 | 9/2008 | Moslehi |
| 2009/0052852 | A1 | 2/2009 | Mikovich et al. |
| 2009/0086298 | A1 | 4/2009 | Okorogu |
| 2009/0116804 | A1 | 5/2009 | Peng |
| 2009/0199893 | A1 | 8/2009 | Bita et al. |
| 2009/0252456 | A1 | 10/2009 | Rasras |
| 2010/0108133 | A1 | 5/2010 | Bhagavatula |
| 2010/0015560 | A1 | 6/2010 | Scherer et al. |
| 2010/0202734 | A1 | 8/2010 | DeCorby |
| 2011/0002585 | A1 | 1/2011 | Gibson et al. |
| 2011/0019186 | A1 | 1/2011 | Himmelhaus et al. |
| 2011/0277361 | A1 | 11/2011 | Nichol |
| 2012/0000638 | A1 | 1/2012 | Dagli et al. |
| 2012/0127563 | A1 | 5/2012 | Farmer |
| 2012/0135512 | A1 | 5/2012 | Vasyleyev |
| 2015/0228813 | A1 | 8/2015 | Wertsberger et al. |
| 2015/0229852 | A1 | 8/2015 | Wertsberger |
| 2015/0234122 | A1 | 8/2015 | Andle |
| 2015/0247971 | A1 | 9/2015 | Wertsberger et al. |
| 2015/0277065 | A1 | 10/2015 | Wertsberger et al. |
| 2015/0301275 | A1* | 10/2015 | Andle .................... G02B 6/293 385/43 |

FOREIGN PATENT DOCUMENTS

| | | |
|---|---|---|
| GB | 1416154 | 12/1975 |
| GB | 24584526 | 4/2012 |
| JP | S61 249004 | 11/1986 |
| JP | 2003224249 A | 8/2003 |
| JP | 2005316059 | 11/2005 |
| JP | 2007108190 | 4/2007 |
| JP | 2008 064653 | 3/2008 |
| WO | WO1992/10014 | 6/1992 |
| WO | WO2004036265 | 4/2004 |
| WO | WO2005079347 A2 | 9/2005 |
| WO | WO2010039199 | 4/2010 |
| WO | WO2010/065099 | 6/2010 |
| WO | WO2010076791 | 7/2010 |

OTHER PUBLICATIONS

"DOE Solar Energy Technologies program Peer Review" Harry A. Attwater, Nathan S. Lewis, Mar. 9-10, 2009 Denver, CO, US Department of Energy.

"Multi-Bandgap High Efficiency Converter (Rainbow)", Carol R. Lewis **, Wayne M. Phillips, Virgil B. Shields and Paul M. Stella, Ivan Bekey, Jet Propulsion Laboratory, Pasadena, California Institute of Technology.

"Trapping a Rainbow: Researchers Slow Broadband Light Waves With Nanoplasmonic Structures", Science Daily Mar. 15, 2011, www.sciencedily.com /releases/2011/03/110314152921.htm.

"Visible-band dispersion by a tapered air-core Bragg waveguide" B. Drobot, A. Melnyk, M. Zhang, T.W. Allen, and R.G. DeCorby, Oct. 8, 2012 / vol. 20, No. 21 / Optics Express 23906, © 2012 Optical Society of America.

Extraordinary optical transmission through metal films with sub wavelength holes and "slits" , A. S. Vengurlekar, Tata Institute of Fundamental Research, Mumbai 400005, MS Completed in Oct. 2009, to appear in Current Science, J. of Ind. Acad .Science.

"Efficiency and finite size effects in enhanced transmission through subwavelength apertures", F. Przybilla, A. Degiron, C. Genet, T.W. Ebbesen, F. de L'eon-P'erez, J. Bravo-Abad, F. J.Garc'ia-Vidal, L. Mart'in-Moreno. Jun. 23, 2008 / vol. 16, No. 13 / Optics Express 9571, © 2008 Optical Society of America.

"Nanoscale Devices for Rectification of High Frequency Radiation from the Infrared through the Visible: A New Approach" N. M. Miskovsky, P. H. Cutler, A. Mayer, B. L. Weiss, Brian Willis, T. E. Sullivan, and P. B. Lerner Copyright © 2012 N. M. Miskovsky et al. Journal of Nanotechnology vol. 2012 (2012), Article ID 512379.

Light transmission through perforated metal thin films made by island lithography, Mino Green, Futing Yi, 2004 Elsevier B.V. Available online Jul. 2, 2004.

"Trapping light in plasmonic waveguides", Junghyun Park, Kyoung-Youm Kim, Il-Min Lee, Hyunmin Na, Seung-Yeol Lee, and Byoungho Lee, Jan. 18, 2010 / vol. 18, No. 2 / Optics Express 598, © 2010 Optical Society of America.

(56) References Cited

OTHER PUBLICATIONS

"Stopping light by an air waveguide with anisotropic metamaterial cladding" Tian Jiang, Junming Zhao and Yijun Feng, Jan. 5, 2009 / vol. 17, No. 1 / Optics Express 170, © 2008 Optical Society of America.

"Light transmission through a single cylindrical hole in a metallic film" F. J. Garc'ia de Abajo Dec. 2002 / vol. 10, No. 25 / Optics Express 1475 © 2002 Optical Society of America.

"Transmission of light through thin silver films via surface plasmon-polaritons", Armando Giannattasio, Ian R. Hooper, and William L. Barnes. Nov. 29, 2004 / vol. 12, No. 24 / Optics Express 5881, © 2004 Optical Society of America.

"Experimental verification of the "rainbow" trapping effect in plasmonic graded gratings" Qiaoqiang Gan, Yongkang Sao, Kyle Wagner, Dmitri V. Vezenov, Yujie J. Ding, and Filbert J. Bartoli.

"Rainbow Trapping in Hyperbolic Metamaterial Waveguide", Haifeng Hu, Dengxin Ji, Xie Zeng, Kai Liu & Qiaoqiang Gan, Scientific Report 3, Article No. 1249, Feb. 13, 2013, Nature.com,© 2013 Nature Publishing Group, a division of Macmillan Publishers Limited. Creative Commons.

"Photonic Design Principles for Ultrahigh-Efficiency Photovoltaics", Albert Polman and Harry Atwater, Nature Materials vol. 11, Mar. 2012, © 2012 Macmillan Publishers Limited.

"Surface-Plasmon-assisted resonant tunneling of light through a periodically corrugated thin metal film", Ivan Avrutzki, Yang Zhao, and Vladimir Kochergin, Optics Letter vol. 25, No. 9, May 1, 2000 © 2000 Optical Society of America.

"Let the Light in", PV Magazine Oct. 2012 www.pv-magazine.com, Berlin, Germany.

Trapped Rainbow 'storage of light in metamterials', Kosmas L Tsakmakidis, Allan D. Boardman & Ortwin Hess, Nature vol. 450, Nov. 25, 2007 397-401 © 2007 Nature Publishing Group.

"Efficient Harvesting of Solar Energy with Rectennsa", Steve Hall, Yi Huang, Yoachun Shden and Paul Claker, University of Liverpool, Liverpool England, Sep. 2011.

United Kingdom Intellectual Property Office Search Report in GB 1222557.9, "Continuous Resonant Trap Refractor, Waveguide Based Energy Detectors, Energy Conversion Cells, and Display Panels Using Same", Feb. 1, 2013.

* cited by examiner

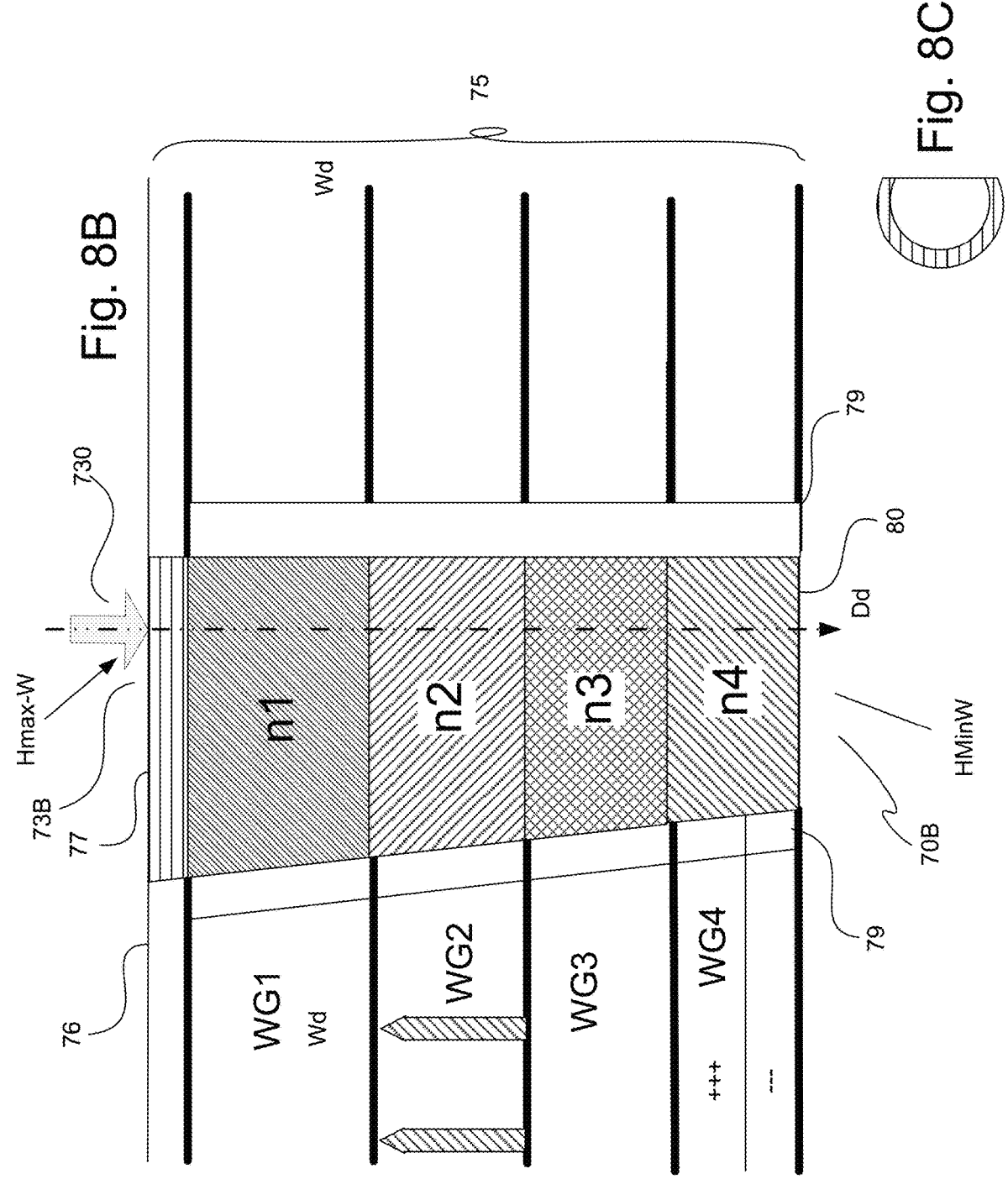

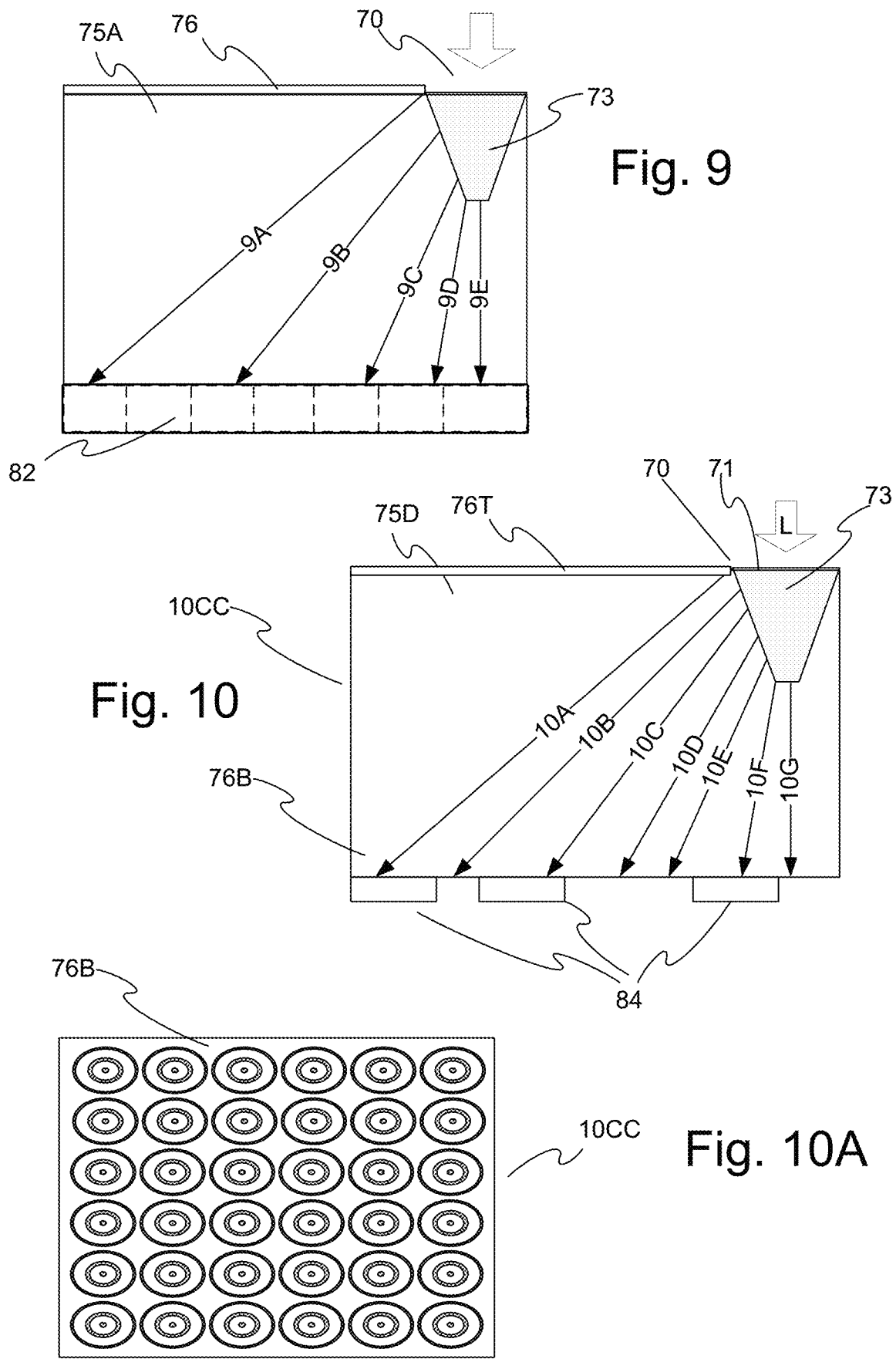

NANO-SCALE CONICAL TRAPS BASED SPLITTER, COMBINER, AND REFLECTOR, AND APPLICATIONS UTILIZING SAME

RELATED APPLICATIONS

This application claims the right of priority to U.S. patent application No. 62/346,123 filed Jun. 6, 2017.

Aspects relating to the present invention were first disclosed in U.S. Patent Application 61/701,687 to Andle and Wertsberger, entitled "Continuous Resonant Trap Refractor, Waveguide Based Energy Detectors, Energy Conversion Cells, and Display Panels Using Same", filed 16 Sep. 2012. Further refinements of the tapered waveguide based Continuous Resonant Trap Refractor (CRTR) and to lateral waveguides with which CRTRs may cooperate, were disclosed together with various practical applications thereof in the following additional U.S. Patent Applications 61/713,602, entitled "Image Array Sensor", filed 14 Oct. 2012; 61/718,181, entitled "Nano-Scale Continuous Resonance Trap Refractor", filed 24 Oct. 2012; 61/723,832, entitled "Pixel Structure Using Tapered Light Waveguides, Displays, Display Panels, and Devices Using Same", filed 8 Nov. 2012; 61/723,773, entitled "Optical Structure for Banknote Authentication", filed 7 Nov. 2012; Ser. No. 13/726,044 entitled "Pixel Structure Using Tapered Light Waveguides, Displays, Display Panels, and Devices Using Same", filed 22 Dec. 2012, now issued as U.S. Pat. No. 8,532,448; Ser. No. 13/685,691 entitled "Pixel structure and Image Array Sensors Using Same", filed 26 Nov. 2012, now issued as U.S. Pat. No. 8,530,825; Ser. No. 13/831,575 entitled "Waveguide Based Energy Converters, and energy conversion cells using same" filed Mar. 15, 2013; 61/786,357 titled "Methods of Manufacturing of Continuous Resonant Trap Structures, Supporting Structures Thereof, and Devices Using Same" filed Mar. 15, 2013, 61/801,619 titled "Tapered Waveguide for Separating and Combining Spectral Components of Electromagnetic Waves" filed Mar. 15, 2013, U.S. 61/801,431 titled "Continues Resonant Trap Refractors, lateral waveguides, and devices using same" filed Mar. 15, 2013, all to Andle and Wertsberger; and 61/724,920, entitled "Optical Structure for Banknote Authentication, and Optical Key Arrangement for Activation Signal Responsive to Special Light Characteristics", filed 10 Nov. 2012, to Wertsberger. All of the above-identified patents and patent applications are hereby incorporated herein by reference in their respective entirety.

FIELD OF THE INVENTION

This invention relates generally to optical nanostructures, and more specifically to a tapered core waveguide nanostructure based combiner and/or splitter, and to combinations and applications thereof.

BACKGROUND OF THE INVENTION

Various areas of physics require spatially separating radiant energy into its spectral components such as by frequency and/or polarization. By way of example such fields include solar cells, image array sensors, filters, energy harvesting devices, certain types of reflectors, receivers and parts thereof, and the like. Similarly, various areas will benefit from mixing various spectral components into a broader type of radiant energy, combining a plurality of 'narrower' spectral components into a 'broader' radiant energy.

In its most basic form, the term 'refraction' means the change of direction of a ray of light, sound, heat, radio waves, and other forms of radiant energy, as it passes from one medium to another. Generally waves of different frequencies would refract at different angles and different speeds in different mediums, and thus refraction tends to spatially separate multispectral radiant energy into its spectral components by frequency. The term 'spectral component' will relate to the energy or a portion thereof in the spectral range of interest, which is being acted upon, and is characterized by one or more of its frequency, polarization, phase, flux, intensity, incidence, radiosity, energy density, radiance, or any combination thereof. Multi-spectral energy relates to energy having at least two spectral components.

Electromagnetic (EM) radiant energy extends over a broad frequency spectrum, however many applications deal only with portions of this spectrum. Light is one form of radiant energy which may be considered as an alternating EM radiation at very high frequency. Humans perceive different visible light frequencies as different colors, but there is a large amount of radiation that is not perceived by humans, generally known as UV (Ultra Violet), and IR (Infra Red), and the term light extends thereto. Visible light ranges generally between wavelengths ($\lambda$) 760-390 nm and roughly corresponds to the peak intensity of solar radiation transmitted through the atmosphere. Infrared radiation ranges from the extreme far end of 1 mm (33 THz; millimeter radio waves) to about 760 nm. The range of millimeter waves, also known as Extra High Frequency (EHF), as well as portions of the microwave range are specifically considered as part of the possible spectral range of different embodiments, as their behavior is sufficiently similar for the purposes of combining and separating radiant energy, and their dimensions are sufficiently small so as to benefit from various aspects of the invention. Spectral components of EM radiation may differ by their frequency and its related wavelength $\lambda$, by its polarization or field orientation, by being magnetic or electric, and the like. The terms EM energy and radiant energy shall be used interchangeably in these specifications.

It is seen therefore that radiant energy extends over a very broad radiation spectrum, and any applications would need to cover only portions of this spectrum. By way of example, for solar energy applications the spectral range of interest will likely be a spectrum containing most if not all of the solar spectrum available at the location where the solar cell is to be deployed, or the portion thereof which is economically used by the device at hand, typically of wavelength within 2-3 μm to 300 nm for example. The spectral range of interest for most display devices will fall within the visible light spectrum, even if some special application demand extending the spectral range. In some applications a specific wavelength may be desirably attenuated, such as by way of example reduction of blue light for aircraft pilot related devices. Yet, for devices directed to heat energy recovery, it is likely that only the infra-red portion of the spectral range is of interest. Similarly, the spectral range of interest may be applicable to portions of a device, such that by way of example, a device may be directed to a broad spectrum, but portions thereof may be directed to a narrower spectrum, and the spectral range of interest is thus limited to the range of interest for that portion of the device. By way of a non-limiting example a television may occupy a display portion that utilizes Conical Traps (CT's) as described below and additional emissions such as audio outputs. The spectral range of interest of the display may only extend to the visible range, even if the device as a whole includes the aural range as well, the aural range does not fall within the spectral range of the CT used in the television. It is seen therefore that the application at hand determines the spectral range of interest, and that a spectral range of interest may differ by application, an apparatus, or a portion thereof. Regarding lateral waveguides, which is described below, each waveguide may have its own spectrum of interest, which may differ from the spectral range of interest of an adjacent waveguide. Similarly, for array of CT's, each CT may have its own spectral range or ranges of interest.

Therefore, the spectral range of interest is defined herein as relating to any portion or portions of the total available spectrum of frequencies and/or polarizations, which is being utilized by the application, apparatus, and/or portion thereof, at hand, and which is desired to be filtered, channeled, detected, emitted, and/or reflected utilizing the technologies, apparatuses, and/or methods of the invention(s) described herein, or their equivalents.

At sufficiently high frequencies, radiant energy is also commonly considered as a flow of photons, which are quantized units of energy which increases with frequency. Under this quantum physics description, the energy density associated with electric and magnetic fields are probability distributions of photons. Therefore certain terms that are common to simple electromagnetic energy can be better clarified as relating to the spectrum of interest. Thus, in the optical portion of the spectrum (which includes IR, visible light, and UV) a dielectric material in the above mentioned energy spectrum of interest relates to a material having low conductivity, and having a band-gap between a filled valence band and an empty conduction band exceeding the energy of any photon in the spectrum of interest to a specific application. In contrast, a transparent conductor is a material having a finite but meaningful conductivity due to a partially filled conduction band or partially empty valence band but having a band-gap between the valence band and conduction band exceeding the energy of any photon in the spectrum of interest. These materials act like a dielectric at high frequencies but act like a conductor at low frequencies. Transparent dielectric materials also have low optical losses such that photons efficiently transmit through such material, at least at the optical spectrum of interest or a significant portion thereof.

While transparent conductors may be considered as wide bandgap semiconducting materials, they are used as conductors in most applications. Dielectrics, transparent conductors, and semiconductors, as used in these specifications, refer to materials that have a dielectric constant at optical frequencies; however the distinction between a semiconductor and the remaining materials is that the bandgap of a semiconductor is not substantially larger than the photon energy. As a general and non-limiting guideline, table 1 describes several characteristics of the different conductive, insulating, and semi-conductive materials.

TABLE 1

| | Material | | | |
| --- | --- | --- | --- | --- |
| | Metal | Transparent conductor | Semi-conductor | Dielectric |
| Bandgap | → 0 | >> photon | ≤ photon | >> photon |
| DC Conductivity | high | good | Varies | → 0 |
| Optical Property | reflective | transparent | absorptive | transparent |
| Dielectric constant | complex | low loss | lossy | low loss |

Waveguides are a known structure for trapping and guiding electromagnetic energy along a predetermined path. Common waveguides have a waveguide having a certain refractive index, and are surrounded by a cladding having lower refractive index. The cladding confines the radiant energy within the core by a process of internal reflection. Waveguides have a cutoff frequency, which is dictated by the wave propagation velocity in the waveguide materials, and the waveguide width. As the frequency of the energy propagating in the waveguide approaches the cutoff frequency Fc, the energy propagation speed along the waveguide is slows down. The energy propagation of a wave along a waveguide may be considered as having an angle relative to cladding. This angle is determined by the relationship between the wavelength of the wave and the waveguide width in the dimension in which the wave is being guided. If the width of the waveguide equals one half of the wave wavelength, the wave reaches resonance, and the energy propagation along the waveguide propagation axis stops.

In these specifications, the term absorbent stratum refers to an object having a plurality of energy conducting layers such that energy entered into a single layer from the layer narrow side is guided within the layer, or absorbed thereby. At least one of the layers defines the stratum effective depth. The stratum also having at least one face termed the top face, larger in at least one dimension than the effective depth, and the effective depth is considered orthogonal to the stratum face, and extending therefrom along at least two of the layers. In many embodiments the stratum has an opposing face, which is termed the bottom face. In certain embodiments the effective depth may extend to the thickness of the stratum, while in others the effective depth is smaller, and may cover less than the depth of all of the layers. Oftentimes a transducers are disposed within the layers or the layers themselves form one or more transducers. In certain specific embodiments the stratum comprises a top layer which is at least partially opaque to the EM energy of interest, and a second layer which is at least partially transparent or translucent to the EM energy of interest. Such stratums are referred to herein as bulk type stratum or equivalently a non-absorbent stratum, and should not be confused with the absorbent stratum, in which it is intended that the energy to and/from the CT is transduced, and thus absorbed. In a non-absorbent stratum the energy is intended to travel therethrough primarily unconverted and unintentional loses such as absorption or conversion to heat are hereby considered negligible. Unless specifically identified within a context, the term stratum would relate to absorbent stratum.

The term Conical Trap (CT) relates to a conical cavity formed in either absorbent or non-absorbent stratum and defined therein, the cavity having its base parallel to the face, the cavity is dimensioned such that it admits at least one spectral component impinging on the stratum face, and the cavity cross-section parallel to the substrate face is successively reduced such that in at least one direction thereof the cross-section is dimensioned smaller than the wavelength of the at least one spectral component. Such a structure forms a tapered cavity tapering away from the stratum top layer. The wider base of the cavity closer to, or congruent with, the stratum top face, is referred to herein as the aperture. A longitudinal axis is defined as being extending between the aperture and its opposite face or point of the cavity, the axis defining increasing depth in a direction extending away from the aperture towards narrower portions of the cavity. The aperture and the cavity may be elongated or asymmetrical, and in such cavity the depth increases towards the narrower portion of the cavity in at least one direction. By way of example in a V or a U cross-section type CT, the depth increases away from the open portion of the V or U cross-section towards the closed end. A parallel plane is defined as being orthogonal to the longitudinal axis. The longitudinal cross-section of the cavity may resemble a triangle or may be truncated, however the end of the cavity opposing the aperture and having positive depth is termed the conical trap tip. Notably, the parallel cross-section of the aperture and in truncated cone CT the aperture or the tip may be of any desired shape. Thus by way of example the aperture may have a generally rectangular parallel cross-section, and the CT as a whole may form an elongated slot.

The term cone departure position (CDP) defines the general location or region along the tapered cavity of the CT side perimeter, where a substantial portion of the energy of a wave traveling within a conical trap departs therefrom into the stratum. Generally the CDP occurs at a fraction of the wavelength, and most commonly that fraction lies between half and one wavelength (>0.5λ; <1λ). As discussed below, energy may be coupled into the conical cavity at the region about which cone departure position would occur, as well as be outputted therefrom.

The term Continuous Resonant Trap Refractor (CRTR) refers to a structure which shares many of the characteristics and embodiments of a CT however the CRTR requires a cladded tapered core with the cladding disposed about the cavity, separating the stratum from the cavity. More detailed definitions of the CRTR may be found in any applications incorporated herein by reference supra.

Collectively, objects, materials, and structures, which inter-convert electromagnetic and electrical energy are known by various names which denote equivalent structures, such as converters, transducers, absorbers, detectors, sensors, and the like. To increase clarity, such structures will be referred to hereinunder as 'transducers'. By way of non-limiting examples, the term "transducer" relates to light sources, light emitters, light modulators, light sensors, photovoltaic materials including organic and inorganic transducers, quantum dots, CCD and CMOS structures, LEDs, OLEDs, LCDs, laser sources, receiving and/or transmitting antennas and/or rectennas, phototransistors photodiodes, diodes, electroluminescent devices, fluorescent devices, gas discharge devices, electrochemical transducers, and the like. Certain transducers may be configured to convert energy forms bidirectioanlly, such as a single transducer which may operate as a converter from electrical energy to radiant energy, and vice versa. Alternatively transducers may be built to convert only from one energy form to another. Transducers for conversion of radiant energy to electricity or electrical signals (hereinafter "LE"), or conversion of electrical signals into radiant energy such as light (hereinafter "EL") are known.

A transducer of special construction is the RL transducer, which is a reflective transducer. Reflective transducers controllably reflect radiant energy. Such transducers may comprise micro-mirrors, light gates, Liquid Crystals (LCD), antenna reflectors, and the like, positioned to selectively block the passage of radiant energy, and reflect it into a predetermined path, which is often but not always, the general direction the energy arrived from. Certain arrangements of semiconductor and magnetic arrangements may act as RL transducers by virtue of imparting changes in propagation direction of the radiant energy, and thus magnetic forces or electrical fields may bend a radiant frequency beam to the point that in effect, it may be considered as reflected. RL transducers may be fixed, or may be used to modulate the energy direction over time. Passive transducers such as LCD and micromirrors fall into the RL class of transducers when used to reflect incoming energy, but when used in conjunction with at least one light source, such transducers may also be considered as LE type transducers.

Radiant energy transducers, and especially LE transducers, typically employ normal incidence of radiant electromagnetic energy onto a conversion structure. Normal incidence has the limitation of a finite probability of detecting energy before it is transmitted through the conversion layer. Energy transmitted through the conversion layer is, at best, lost and, at worst, converted to heat in the supporting substrate. Several attempts has been made to provide transducers that use 'side illumination' in which the light is inserted from the side of the junction. Such examples include, inter-alia, in U.S. Pat. No. 3,422,527 to Gault, U.S. Pat. No. 3,433,677 to Robinson, and U.S. Pat. No. 4,332,973 to Sater.

Prisms and other refractive devices can be used to improve incidence angles, and to direct different frequencies of radiant energy to different regions of a transducer, where each region is optimized for a target frequency. U.S. Pat. No. 7,888,589 to Mastromattteo and U.S. Pat. No. 8,188,366 to Hecht, disclose examples of such devices. Different arrangements of concentrators are also known, which are operative to concentrate energy to transducers. U.S. Pat. No. 5,578,140 to Yogev et al. as well as Hecht provide examples to such arrangements. Those methods require significantly increased device area, and reduce the total energy per unit area (and per unit manufacturing cost) in exchange for increased efficiency.

Vertical optical waveguides are known in the prior art. U.S. Pat. No. 4,251,679 to Zwan depicts a plurality of transducing cavities having an inwardly inclined wall to receive impinging radiation. Two potential barrier strips each having different conduction electron densities; each potential barrier strip is connected to a conductor having a preselected conduction electron density whereby radiation impinging on a cavity will induce current flow which will be rectified across the potential barriers. U.S. Pat. No. 3,310,439 to Seney relates to embedding spaced dimensioned crystals into p-n semiconductor layers of a solar cell device. The crystals function as waveguides into the photovoltaic layer.

Edge illuminated waveguides are also known. In US 2007/0034250 Dutta discloses an edge fed photovoltaic device utilizing a multicomponent semiconductor.

It is further important to differentiate the Bragg based waveguides or photonic based waveguides, from the common waveguides—a Bragg based waveguide utilizes periodic structures, and generally requires at least three quarters of the wavelength with materials or internal structures having periodic structures. Photonic cladding is yet another type of material used in waveguides, and comprises periodic voids or shapes to allow passage of certain wavelengths and blocking of others. Photonic waveguides fall generally into two basic groups, namely high index waveguide, and low index waveguide, where in the high index waveguide the core has a higher refractive index than the cladding, however unlike in the common waveguide, the cladding effective lower refractive index is provided primarily by microstructure regions formed in the cladding, rather than the general material characteristics. In low-index photonic waveguides, the core has relatively low refractive, however the waveguiding effect stems from a photonic band-gap, structure, which prevents light from propagating in the cladding. The photonic structures are generally based on periodic voids or arrangement of differing materials within the cladding. In contrast, regular cladding on the other hand comprise a simple material and may be formed at any thickness. The term regular cladding also extends to gradient index (GRIN) type cladding and to equivalent refractive index of layered materials, when appropriate. While regular cladding may be layered, it does not require the periodic structures, allowing significant savings during manufacturing. The terms Bragg or photonic cladding will be used specifically to denote periodicity based cladding.

Tapered waveguide directed at trapping radiant energy, as opposed to emitting energy via the cladding, have been disclosed by Min Seok Jang and Harry Atwater in "Plasmionic Rainbow Trapping Structures for Light localization and Spectrum Splitting" (Physical Review Letters, RPL 107, 207401 (2011), 11 Nov. 2011, American Physical Society©). The article "Visible-band dispersion by a tapered air-core Bragg waveguide", (B. Drobot, A. Melnyk, M. Zhang, T. W. Allen, and R. G. DeCorby, 8 Oct. 2012/Vol. 20, No. 21/OPTICS EXPRESS 23906, ©2012 Optical Society of America_ "Visible-band dispersion by a tapered air-core Bragg waveguide" B. Drobot, A. Melnyk, M. Zhang, T. W. Allen, and R. G. DeCorby, 8 Oct. 2012/Vol. 20, No. 21/OPTICS EXPRESS 23906, ©2012 Optical Society of America) describes out-coupling of visible band light from a tapered hollow waveguide with TiO2/SiO2 Bragg mirrors. The mirrors exhibit an omnidirectional band for TE-polarized modes in the ~490 to 570 nm wavelength range, resulting in near-vertical radiation at mode cutoff positions. Since cutoff is wavelength-dependent, white light is spatially dispersed by the taper. These tapers can potentially form the basis for compact micro-spectrometers in lab-on-a-chip and optofluidic micro-systems. Notably, Bragg mirrors are very frequency selective, complex to manufacture, and require at least a width higher than ¾ wavelength to provide any breadth of spectrum. In addition to the very narrow band, the Bragg mirrors dictate a narrow bandwidth with specific polarization, while providing however a fine spectral resolution. As decribed above, further distinction must be made between a waveguide which uses cladding and a tapered cavity which does not require cladding.

However the known art does not provide a multi purpose small scale splitter/combiner/reflector of radiant energy, and therefore it does not disclose applications of such splitter/combiner/reflector in combination with transducers embedded in a stratum, or a splitter in a non-absorbent stratum. There is therefore a clear and heretofore unmet need for a small-scale spectral manipulation structure that would do one or more of: split multispectral electromagnetic radiation to obtain spectral component(s) contained in the multispectral radiation; mix spectral components to obtain multispectral electromagnetic radiation; redirect incoming electromagnetic energy so as to be diverted at some nonzero angle from its initial propagation direction; separate electromagnetic components by polarization; combine electromagnetic components of different polarizations, controllably reflect certain spectral components, and any combination of the above. There is yet another unmet need for such spectrum manipulating structure embedded in a stratum where the energy is converted by transducers stacked in a stratum.

SUMMARY OF THE INVENTION

It is therefore an object of the present invention to provide a cavity within a substrate for separating mixed electromagnetic waves into spectral component(s) and/or for combining spectral components into mixed multispectral electromagnetic energy.

It is a further object of the present invention to provide a conical trap which is easily manufactured, and which refracts energy into spatially separated component frequencies and/or polarizations. It is another object of the present invention to provide a refractor that will steer the incoming energy from the incidence direction or acceptance cone of a substrate and radiate the spatially separated energy at various depths and/or angles from the incidence direction of the conical trap. An optional object of the invention is to dispose the conical trap in a substrate and direct the spatially separated spectral components to separate transducers.

It is a further object of the invention to provide a compact optical mixer/combiner that will combine radiant energy components from a plurality of sources at various locations and/or angles from the normal incidence direction of the cavity, and output the combined radiation from a single aperture.

It is yet a further object of the invention to provide a hybrid structure in which energy incident at the aperture in one portion of the spectrum is collected while energy generated proximal to, or at, the side of the tapered cavity, in another portion of the spectrum is combined and radiated out of the aperture.

It is yet another object of the invention to provide selective absorption and/or reflection of portions of an incoming spectrum of radiant energy entering the tapered cavity, so as to provide passive reflection of lights as required for a passive display device. Alternatively, the structure may absorb energy of one or more portions of the spectrum, reducing reflection of such energy.

In very basic terms, aspects of the present invention relate to a structure referred to as a Conical Trap (CT) which is based on a tapered cavity formed in and defined by a substrate, the cavity having a wide base face forming an aperture, and a narrower tip. The cavity may be considered as the core of the CT. The CT is disposed within a stratum, the stratum having a top face which is larger than the CT depth in at least one direction, the CT aperture being parallel to and/or congruent to the stratum face. The CT may be operated in splitter mode, in combiner mode, and/or in reflective mode. In splitter mode the radiant energy wave enters the CT at the aperture and travels along the depth direction extending between the aperture and the tip, and in mixer, or combiner mode, the wave travels towards the aperture. The CT depth increases from the aperture towards the tip, such that larger depth implies greater distance from the aperture. Due to the cavity taper, when multi-frequency radiant energy is admitted through the CT aperture, lower frequency waves will reach cone departure position (CDP) before higher frequency waves, and will exit the CT cavity into the substrate at a shallower depth than at least one higher frequency wave. Thus, the CT will emit spatially separated spectrum along its outer side perimeter. Conversely, when operated in combiner mode, a wave is coupled to the cavity of the CT via the side perimeter at coupling depth generally about the CDP of similar spectral component. The coupled wave will travel from the coupling depth towards the aperture, and different frequencies coupled through the CT side perimeter will be mixed and emitted through the aperture. Coupling radiant energy into the CT cavity from the side perimeter, will be related as 'injecting' or 'inserting' energy into the CT.

Plural transducers are disposed to receive spectral components spatially separated by the CT, to inject energy thereto, or to selectively reflect spectral components incoming thereto. In some embodiments at least one of the plurality of transducers is disposed in the substrate, and oftentimes all of the plurality of transducers are disposed within the substrate.

Certain non-symmetrical or multi-faceted symmetrical cavity parallel cross-sections will cause separation of the aperture-admitted radiant energy to be polarization sensitive. Thus, by way of example, a square pyramid or frustum shaped CT cavity will separate incoming radiant energy into its component polarizations as well as by its frequency, wherein energy of differing polarization would depart the CT side wall at different angles. This behavior will be reversed when the CT operates in mixer/combiner mode, such that energy emitted from the aperture will reflect the polarity created by separate sources, and injected into the CT at different faces. By way of none-limiting example, if light source A injects modulated energy into one face of a square cross-section pyramidal cavity, and light source B injects differently modulated energy into a perpendicular face of cavity, the light emitted by the aperture at the base of the pyramid will have one spectral component at a first polarization reflecting the modulation of source A, and a second spectral component at 90° to the first spectral component, representing the modulation of source B. Thus the two sources A and B form an angle therebetween, the angle is said to be parallel to a width plane when an angle exists between the two sources when their location is projected to at least one width plane, regardless of their actual depth. However similar frequency waves of the same polarization may be detected by mutually angled detectors at a single depth or waves may be injected to the CT at the same depth, to obtain polarization discrimination or mixing.

In a first aspect of the invention, there is provided a spectral splitter for spatially separating multispectral radiant energy into at least two spectral component thereof, the splitter comprising a stratum having a top face, a bottom face and a thickness therebetween; at least one tapered cavity formed in a stratum, the cavity having a first end and a second end, the first end defining an aperture substantially parallel and/or congruent with the stratum top face. the cavity has a depth direction extending between the first end and the second end, wherein the depth magnitude increases with distance from the first end towards the second end; The cavity further having a plurality of width dimensions in at least one direction substantially transverse to the depth direction, the cavity width monotonically decreasing in magnitude in at least one direction, as a function of the depth such that the width magnitude at the aperture is higher than the width magnitude at the second end. Stated differently, while the cavity is tapering from the aperture towards the tip, the taper does not necessarily linear or continuous. The aperture is dimensioned to allow passage of radiant energy comprising at least a first and a second spectral components each having a frequency, wherein the first spectral component has a lower frequency than the second spectral component. The varying width of the cavity results in the first and the second spectral components each reaching a cavity departure position (CDP) at which they will depart the cavity and be emitted from the tapered cavity into the stratum at a respective first and second depth, wherein the first depth magnitude is less than the second depth magnitude.

The cavity may be in direct contact with the stratum, or be separated therefrom by a thin passivation layer sufficient to neutralize dangling atomic or molecular bonds in transducers within the stratum. The cavity may be in vacuum or be filled with material having lower refractive index than its surrounding substrate or passivation layer, such as gas, liquid, glass, and the like, with air or vacuum being common. In certain embodiments the tapered cavity may contain a solid of lower refractive index than the refractive index of the stratum At any depth the CT has a plurality of widths transverse to the depth direction. The different widths for a single depth form a width plane, which is transverse to the depth direction, and the term 'in at least one direction' as related to width, relate to directions on the width plane or parallel thereto. Any given depth corresponds with its width plane, and thus there are infinite number of parallel width planes.

In certain embodiments the tapered cavity may exhibit a generally round cross-section on its width plane, however neither a perfect circle nor any specific geometrical shape is required. In some embodiments the tapered cavity cross-section may be symmetrical and in others asymmetrical. In certain embodiments the cross section is square, hexagonal, octagonal, or other symmetrical multifaceted shape. In some embodiments the cavity may form an elongated wedge, e.g. forming a plurality of rectangular cross-sections of smaller width on the respective deeper width planes.

In a similar fashion when operated in splitter mode, and with multifaceted cavity, the first and second spectral components may differ from each other by having different polarization, rather than, or in combination with, different frequency. Therefore, in another aspect of the invention, there is provided a spectral splitter for spatially separating multi-polarization radiant energy into at least two spectral component thereof, the splitter comprising a tapered cavity having a first end and a second end, the first end defining an aperture, the cavity having a depth direction extending between the first end and the second end, wherein the depth magnitude increases with distance from the first end towards the second end. The cavity also has a plurality of stacked cross-sections in a respective plurality of width planes, the cross-sections having at least one width dimension decreasing in magnitude as a function of the depth such that the width magnitude at the aperture is higher than the width magnitude at the second end, at least one of the cross-sections being either a multifaceted symmetrical shape, or an asymmetrical shape. A passivation layer may optionally be used along the outer side perimeter of the cavity. The first end of the cavity, i.e. the aperture, is dimensioned to allow passage of radiant energy comprising at least a first and a second spectral components each having a different polarization associated therewith; the shape of the cross-section of the cavity resulting in the first and the second spectral components each reaching a state at which they will depart the cavity into the substrate at a first and second direction, respectively. At least in cavities having symmetrical multifaceted cross-section, if the spectral components have differing frequencies as well as different polarization, they will reach their CDP at different depth as well as be emitted at a different direction.

Optionally, the splitter also comprises at least a first and a second energy transducers for converting radiant energy to electrical energy (LE) and/or electrical energy to radiant energy (EL), wherein the first transducer is disposed in a path to receive the first spectral component, and the second transducer is disposed in a path to receive the second spectral component, after the respective spectral components exists the waveguide. One or more of the transducers are optionally disposed in the stratum.

In another aspect of the invention there is provided a spectral combiner comprising a tapered cavity disposed within a stratum, the cavity having a first end and a second end, the first end defining an aperture, the cavity having a depth direction extending between the first end and the second end, wherein the depth magnitude increases with distance from the first end towards the second end, the cavity having a width dimension in at least one direction transverse to the depth direction, and the cavity width decreasing in magnitude in at least one direction, as a function of the depth such that the width magnitude at the aperture is higher than the width magnitude at the second end. In certain embodiments a passivation layer is disposed between the cavity and the substrate, to passivate any atomic or molecular dangling bonds of the substrate. At least a first and a second radiant energy sources are disposed about the CT such that when energized they couple energy emitted therefrom to the cavity. The energy emitted from the energy sources is coupled into the cavity at or about an integer multiple of half of the respective wavelength of the source. Preferably the integer multiple is one, and the cavity width equals, or slightly larger than, half the wavelength to provide efficient coupling of the energy into the cavity.

The term "about the CT" or equivalently about its core or cavity, should be construed to mean being coupled to via energy path, which implies that the transducer is disposed about the CT not only by being physically adjacent to the cavity side perimeter, but also when an energy path such as beam propagation, waveguide, and the like, exists between the location where energy is transferred in or out of the cavity, and the transducer. Similarly, the disposition about the CT is set by the location at which the energy exists or enters the cavity, namely the CDP. Thus, by way of example if the transducer is coupled to the CT via a waveguide such that the energy couples at depth A of the CT, the transducer is considered to be disposed at depth A regardless of its physical location relative to the CT.

The aspect of the invention which required a specific symmetrical multifaceted cavity cross-section in at least one depth, may act as a cavity for other aspects of the invention. Indeed the tapered cavity disclosed may be operated in a splitter mode and/or combiner mode, depending on the direction of energy propagation. In splitter mode energy admitted into the CT via the aperture is split to its spectral components either by frequency, polarization, or a combination thereof, and the spectral components are emitted via the outer side periphery of the cavity. When operated in a combiner mode, spectral components of the energy are admitted into the CT cavity via the side periphery thereof, the spectral components are combined and are emitted via the aperture. Notably, the tapered cavity may be operated as combiner and a splitter simultaneously, for different spectral components. As certain structural aspects are common to the two aspects on the invention, many of the following additional features may be considered applicable to different aspects, separately or in combination. For the purpose of this disclosure, negligible material and interface loses between the CT and the stratum are ignored, as are any such loses that may be introduced by the optional passivation layer.

In combiner embodiments where the energy sources are of different frequency, they are arranged to couple to the cavity at different width planes, and optionally energy sources are arranged to inject energy which will be emitted via the aperture at separately controlled polarization. The energy sources would be arranged to inject the energy at different axes of the cross-section of the cavity, thus forming an angle therebetween on a plane parallel to a width plane. Clearly, combinations of energy sources to produce combinations of multi-frequency and multi-polarization are explicitly considered. In order to derive multiple polarizations, a multifaceted cavity is preferred, wherein the first and the second energy sources are disposed to couple the energy emitted therefrom into different facets of the multifaceted cavity.

CTs may also be operated in reflective modes, where a RL transducer is disposed such that a spectral component of radiant energy admitted into the tapered cavity is emitted via the cavity side periphery, and impinge upon the RL type transducer. The RL transducer controllably reflects at least a portion of the energy impinging thereupon via the side periphery back into the cavity, where it is emitted via the aperture.

In splitter mode, asymmetrical cavity cross-section or multifaceted symmetrical cross-section would also provide a splitter that will split the energy admitted into the cavity via the aperture to spectral components based on their polarization. Splitting the aperture-admitted energy in combinations of frequency and polarization are yet another feature of the invention.

To increase brevity, the structures described above, whether operated in combiner mode, splitter mode, reflective mode or any combination thereof, will be related as CT. CTs are described more completely below.

At least the outer side periphery of the CT is disposed within the stratum. The stratum may be disposed on top of a substrate if one is used. Additional materials may be disposed on top of the stratum, such as anti-reflective layers, protective layers, collimation layers, lenses, and the like. Stratums may be roughly divided into slab stratum and layered stratum, and the selection of the type of stratum is a matter of technical choice. Certain layered stratums are formed as a plurality of superposed waveguides, termed stacked waveguides, or equivalently as lateral waveguides or superposed waveguides hereinafter. The waveguides in such a stacked waveguide system may be coupled with one or more CT such that spectral component(s) separated by a CT are directed toward one or more of the stacked waveguides. In other embodiments the stratum comprises a slab of material that is transmissive of the radiant energy spectral range of interest. Lateral waveguides are edge-fed, from CT's, CRTR's, or similar splitters. Lateral waveguides may comprise one or more radiant energy sources.

In some embodiments the tapered cavity is a symmetrical multifaceted cavity, and a first transducer is disposed about a first face of the multifaceted cavity, and a second transducer is disposed about a second face of the multifaceted cavity. In splitter modes the energy transducers convert radiant energy to electrical energy (LE transducers) and the structure provides detection of spectral components of two separate polarizations. In combiner modes, the transducers convert electrical energy to radiant energy (EL transducers), or modulate radiant energy in accordance with an electrical signal (RL transducers), and the structure provides a combiner which can emit radiant energy through the aperture where the energy has two separately controlled polarization spectral components, each reflective of the respective signal fed to the transducers.

In certain aspects of the invention the splitter further comprises a plurality of controllable light modulators, disposed about the side periphery.

While the CT is useful as a standalone invention in certain applications, it is oftentimes more useful when a plurality of such CT structures operates in combination. To that end in an aspect of the invention there is provided an array comprising a plurality of CT spectral splitters embedded in a spectrum. In some embodiments, such array further comprises one or more lenses disposed over the apertures of the plurality of splitters. In some embodiments the apertures of the plurality of splitters lie substantially on a focal plane of the lens. Each of the CT members of the array may then become a pixel in an image sensor, or a portion of an advanced, concentrated solar cell, phased array antenna, and the like.

Similarly, in an aspect of the invention CTs operated as combiners may be operated as an array forming a display in the visible light spectrum, or be operated as an antenna which may steer a beam as a phased array antenna. As described, a single CT may operate in a combiner mode and/or in splitter mode, and therefore a combination of the functions described above may be utilized. By way of non-limiting example, a single transmitting/receiving antenna may be formed of an array of cooperating CTs. Such array may act to steer a beam in any of desired directions by feeding the transducers of the CTs with signals having a phase difference therebetween.

Another aspect of the invention relates to phased array antennas. Phased array antennas operate on principles of interference between the radiant energy emitted from various antenna elements. Such interference may be created by manipulating the phase and/or amplitude of the signal emitted form a plurality of antenna elements. The steering of the antenna offers the ability to radiate extremely narrow beam which in certain embodiments may be utilized for writing or marking very small features such as features used in the photolithography. The small size of the individual CTs and their ability to provide high intensity signals make the CT based phased array a powerful tool. By way of example, an array of CTs dimensioned to operate at the UV range would be very small as each antenna element would be just over half of the longest emitted wavelength. In this type of phased array only a single transducer may be used per CT, however a plurality of transducers may provide better resolution. UV lasers coupled to separate CTs or to one CT, may be individually controlled and fed different phase and/or amplitude signals, and their interference would allow for a beam to form features that are far smaller than the wavelength. Such arrays may also be used for writing of certain images, for ablating material in a programmatic manner, as well as form scanning beams such as radar and the like. Similarly, in much lower frequencies radar type antennas may be formed by a plurality of CT's dimensioned properly for the operating frequency, wherein the compact size and high efficiency can provide an improved radar antennas used for transmitting and/or receiving. High directionality communications antennas of various frequencies may also be formed utilizing CT's.

The terms 'symmetrically multifaceted core' or 'multifaceted symmetrical core' imply that the core is shaped as three dimensional multifaceted body having at least one symmetrical polygonal cross-section. The consecutive cross-sections of such body may differ in shape, but generally are smaller in at least one dimension, the further the cross-section is along the depth axis. In some embodiments, the base is of different shape and slowly vary towards the symmetrical polygon. However relating to a radiant energy having at least a first spectral component having a first polarization and a second spectral component having a different polarization, a symmetrical multifaceted core may be recognized by having at least one cross-section at the width plane, where in splitter mode, the first spectral component will exit the CT in different direction than the second spectral component. Commonly, the multifaceted symmetrical core is formed by a polyhedron having a symmetrical polygonal base and converging triangular or trapezoidal sides, where the base is substantially transverse to the depth direction. Notably multi-faceted core symmetry and certain asymmetrical core forms may operate to separate or combine spectral components of different polarization. For the purposes of these specifications, such asymmetrical core forms is considered as multifaceted symmetrical form, and the specifications and claims extend thereto.

A CT is considered to operate in hybrid mode when radiant energy is both admitted and emitted via the aperture. An aspect of the invention in hybrid mode involves energy being admitted via the aperture and at least portions thereof being emitted via the side periphery of the CT cavity, while other energy is being injected via the side periphery and emitted via the aperture. In other embodiments a portion of the energy admitted via the aperture is selectively reflected back therethrough, such as when utilizing a RL type transducer. A hybrid transmitter may be considered as any one of a) an emitting CT operating as a mixer, b) a sensing or receiving CT acting in splitter mode, and/or c) a reflective CT operating with at least one RL type transducer for controllably reflecting at least part of energy admitted via the aperture. Thus, by way of example, a call for a splitter CT in these specifications may be fulfilled by a hybrid CT capable of acting as a splitter.

CTs may also operate in reflective mode, by providing light gates which will reflect radiant energy back into the CT tapered core. A light gate disposed at the CDP depth, where radiant energy is emitted out of the side periphery, will cause the emitted energy to be reflected back into the cavity, and thence emitted via the aperture. An array of CTs in conjunction with RL transducers which act as light-gates will have variable reflectivity such that at least a portion of the light incident on the array at the associated frequency will be reflected, in accordance with the setting of the light gate reflectors. The term light gate should be construed to a device able of controlling light passage or block, absorption, reflectance, and the like, across a spectral range of interest, which may extend beyond the visible range. The spectral range of interest is dictated by the application at hand.

The broad band capabilities of the CT allows modulation of its reflectance, absorption, or transmittance over a broad band of frequencies, extending the ability for such operations into the UV, IR, and even the mm wave, EHF and SHF spectrum. Reflective mode may also operate in polarization sensitive mode as explained above for EL and LE transducers in polarization sensitive mode.

Therefore, in certain embodiments there is provided a hybrid spectral splitter and combiner the hybrid comprising: a tapered cavity having a first end and a second end, the first end defining an aperture, the cavity having a depth direction extending between the first end and the second end, wherein the depth magnitude increases with distance from the first end towards the second end; the cavity having a width dimension in at least one direction transverse to the depth direction; the cavity width decreasing in magnitude in at least one direction, as a function of the depth such that the width magnitude at the aperture is higher than the width magnitude at the second end. The tapered cavity is disposed within a stratum. The first end of the core is dimensioned to allow passage of radiant energy comprising at least an admitted spectral component having a frequency associated therewith, wherein the varying width of the cavity resulting $\lambda_{max}$ in the admitted spectral components reaching a CDP—a state at which they will exit the cavity via the peripheral side walls—at a at a frequency dependent depth. At least one energy transducer is disposed about the CT to receive the spectral component. Furthermore, the hybrid comprises at least a one radiant energy source disposed about the CT to couple energy emitted therefrom to the cavity via the cavity outer periphery, wherein the energy emitted from the energy source is coupled into the cavity about the coupling depth. Optionally, the transducers and the light sources are integrated in a single component. Further optionally the hybrid and/or the light sources and/or the transducers may be embedded in the stratum. In certain embodiments a passivation layer may be disposed about the cavity, to passivate dangling bonds.

An additional aspect of the invention provides a reflective microstructure comprising a tapered cavity having a first end and a second end, the first end defining an aperture, the cavity having a depth direction extending between the first end and the second end, wherein the depth magnitude increases with distance from the first end towards the second end, the cavity having a width dimension in at least one direction transverse to the depth direction, the cavity width decreasing in magnitude in at least one direction, as a function of the depth such that the width magnitude at the aperture is higher than the width magnitude at the second end. The cavity is disposed in a stratum. The first end of the cavity is dimensioned to allow passage of radiant energy comprising at least one admitted spectral component having a frequency associated therewith. The varying width of the cavity results in the spectral component reaching a cone departure position at which it will penetrate the side periphery of the cavity and exit the waveguide into the stratum, at a frequency dependent depth. At least one RL type transducer is disposed about the cavity side periphery, in a path to controllably reflect the admitted spectral components which was emitted via the cavity side periphery, and reflect at least a portion the radiant energy of the spectral component back into the cavity, where it will be emitted through the aperture.

Amongst others, a stratum may comprise a plurality of superposed waveguides, each waveguide comprising a core layer having a radiant energy transducer disposed therein, and two conductive cladding layers disposed on opposing sides of the core layer, the conductive layers being electrically coupled to the transducer and acting as charge carriers therefore; each waveguide having at least one inlet for passage of radiant energy therethrough, the inlet extending between the cladding layers, such that radiant energy entering the waveguide impinges on at least two layers of the waveguide, the inlet further defining a minimum cutoff frequency for the energy to propagate in the waveguide.

Preferably, at least one transducer comprises an electron donor region and an electron acceptor region. Optionally, an intrinsic layer is disposed between the electron donor region and the electron acceptor region, and further optionally intrinsic layers may be disposed between the electron donor and/or electron acceptor and the respective conductive layers.

In some embodiments two or more waveguides in the stratum are each optimized to have maximum efficiency at a specific frequency band, which in the context of such embodiments may be referred to as its spectral range of interest. The waveguides are generally flat, i.e. have a local length and width that is significantly larger than their thickness, and are superposed with respect to each other. Radiant energy enters or exits (depending on whether the mode of operation is for splitting into or mixing of spectral components) the stratum waveguide from stratum apertures located on the waveguides thickness side, which is to say from a direction that does not cross or penetrate the thickness direction of the cladding. Stated differently, the incoming radiant energy is incident on at least two layers of the stratum waveguide. The stratum apertures, i.e. the apertures via which energy enters the stratum waveguides, are energy coupled to the sides of CT's embedded in the stratum, such that each waveguide receives energy of its own spectral range of interest, and that waveguides receive energy of higher frequency and shorter wavelength depending on their depth from the substrate face closest to the CT aperture.

One option for optimizing the stratum waveguide for its spectral range of interest involves causing a first transducer disposed in a first waveguide among the superposed waveguides to have an energy bandgap that is different from that of a second transducer disposed in a second waveguide among the superposed waveguides. Another optional optimization technique involves causing a transducer disposed within at least one of the plurality of superposed stratum waveguides to have an energy bandgap level that is slightly higher than the photon energy level corresponding to the cutoff frequency of the waveguide. In general, it is desirable to dimension the waveguide thickness just slightly longer than half the longest wave in the spectral range of interest $\lambda wi$. The longest wave in the spectral range of interest for an individual waveguide within the stacked waveguide, is the longest wavelength that the transducer disposed therein can convert. In LE transducers the energy bandgap of the transducer dictates the longest convertible wave, and the minimal frequency of the spectrum of interest $\lambda wi$ for such waveguide relates to that minimal frequency. While thickness of about 1-2% above $\lambda wi/2$ is a desired aperture, it is expensive and often impractical. Aperture ranges such as 10-20% longer than $\lambda wi/2$ are acceptable for many applications. Waveguide thickness longer than $\lambda$ would still provide advantages, but would not provide significant extension of the effective length of the photoactive region due to slowing of the energy propagation within the waveguide. Conversely, causing the energy bandgap to be 5% higher than the photon energy level corresponding to the cutoff frequency of the waveguide would in some situations be a good compromise between performance and cost.

In some embodiments, the core of at least one of the plurality of superposed stratum waveguides comprises a region of transparent conductor disposed between the electron donor region and the cladding and a region of transparent conductor disposed between the electron acceptor and the cladding. In some embodiments a reflective layer is provided at the bottom of the stack of superposed waveguides. The reflective layer may comprise the lower cladding layer of the lowest waveguide, or it may be a dedicated layer. The lowest waveguide in the stack is the waveguide having either the lowest thickness of the waveguide in the stack, and/or the waveguide having the highest energy bandgap transducer in the stack.

In certain embodiments at least one first transducer is an electricity-to-radiant-energy transducer, and at least one second transducer is a radiant-energy-to-electricity transducer.

In certain embodiments an insulating layer may be disposed between at least two of the plurality of superposed waveguides, while in others the conductive layers of one waveguide may be electrically coupled to the conductive layer, and in some embodiments a single conductive layer may be shared between waveguides of the stack.

A plurality of conical traps are embedded within the waveguide stack, the CT's receive radiant energy at the surface of the stack, or optionally at level above it in case the stratum also comprises a cover layer such as anti-reflective layer, protective layer, filter, and the like. The CT's refract the incoming energy to an angle relative to the normal of the stack surface, and emit the energy in such fashion that it is spatially separated into a plurality of spectral components. The CT's are dimensioned and disposed such that each of the stacked waveguides receives primarily spectral components that match their spectral range of interest as the energy departs the cavity side periphery, in terms of bandgap, waveguide dimensions, and the like. In waveguides utilizing antennas or rectennas type transceivers the length of the antenna/rectenna is optimized for the spectral range of interest.

The energy enters the waveguides of the stack via inlets, the inlets being at the interface where each conical trap interfaces with the respective waveguide. This way each waveguide has many inlets, one or more of which are associated with a CT.

It is noted that in such embodiments the energy is inserted into the waveguides primarily along the interface between two layers. Thus the energy propagates in such fashion that is perpendicular with respect to the generated electric current within a layered transducer disposed within the waveguide.

In an optional embodiment, the transducer comprises a plurality of antennas and the electron donor and acceptor layers are not required. At least two collectors, a positive and a negative, are provided as terminals for collecting electrical energy from the conversion zone.

In some embodiments, detection and/or measurement of various spectral components may be desired about each CT. To that end there is provided a stratum having a layered waveguide stack of radiant energy transducer array comprising a plurality of superposed stratum waveguides, each waveguide comprising a core layer having a plurality of individual radiant energy to electrical energy (LE) transducers disposed therein, and two cladding layers disposed on opposing sides of the core layer; each waveguide having an inlet for passage of radiant energy therethrough, the inlet extending between the cladding layers, such that radiant energy entering the waveguide impinges on at least two layers of the waveguide. The layered stack also contains wiring to provide electrical communication with the plurality of transducers disposed in the core. A plurality of conical traps (CT) are embedded within the stratum for receiving radiant energy substantially parallel to the face of the stratum, refracting the incoming energy to an angle relative to the normal of the stratum face, and emitting the energy in such fashion that it is spatially separated into a plurality of spectral components, wherein each of the plurality of CT's has at least one transducer associated therewith, and receiving a spectral component of the energy impinging thereupon. In certain embodiments, at least two transducers are associated with a single CT, the transducers being disposed at an angle to each other. The optional transducer may be directed at sensing another frequency and/or a different polarization than the first transducer.

Another aspect of the invention is directed to converting electrical energy to radiant energy. To that end transducers in the stratum are of the EL type or the RL type.

CTs may be two dimensional or three dimensional, and the claims relate to both types. Further combinations of elements of different aspects of the invention would be clear in light of the teachings of these specifications.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

Figure 5:
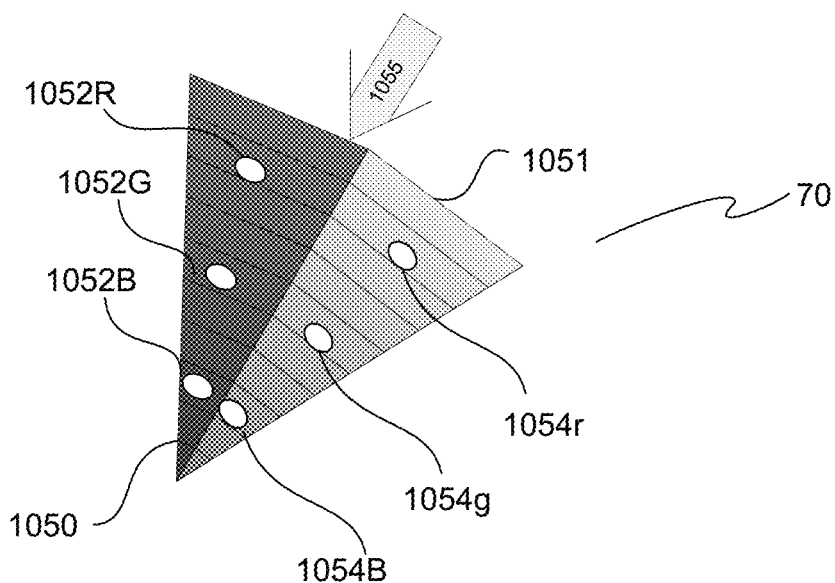
Figure 5A:
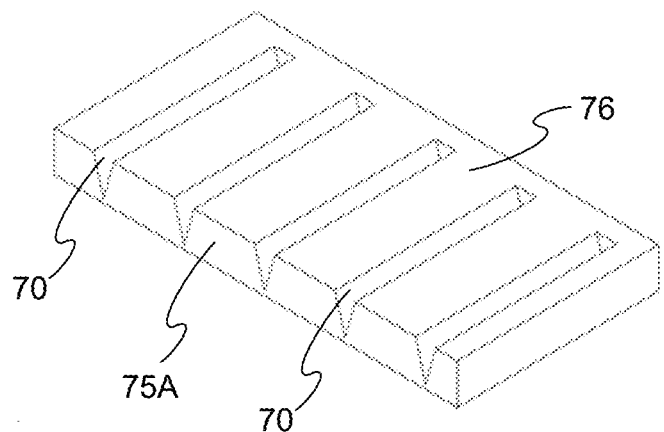
Figure 5B:
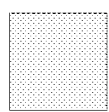
Figure 5B:
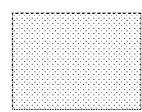
Figure 5B:
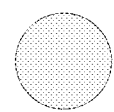
Figure 5B:
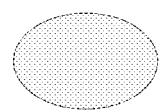
Figure 5B:
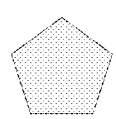
Figure 5B:
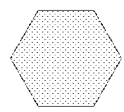
Figure 5B:
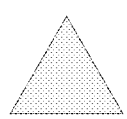
Figure 5B:
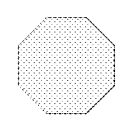

FIG. 5 provide an example of polarization sensitive sensor utilizing CTs. FIG. 5A depicts a CT having a wedge shape, and FIG. 5B depicts several examples of optional width plane cross sections of CT's.

Figure 6:
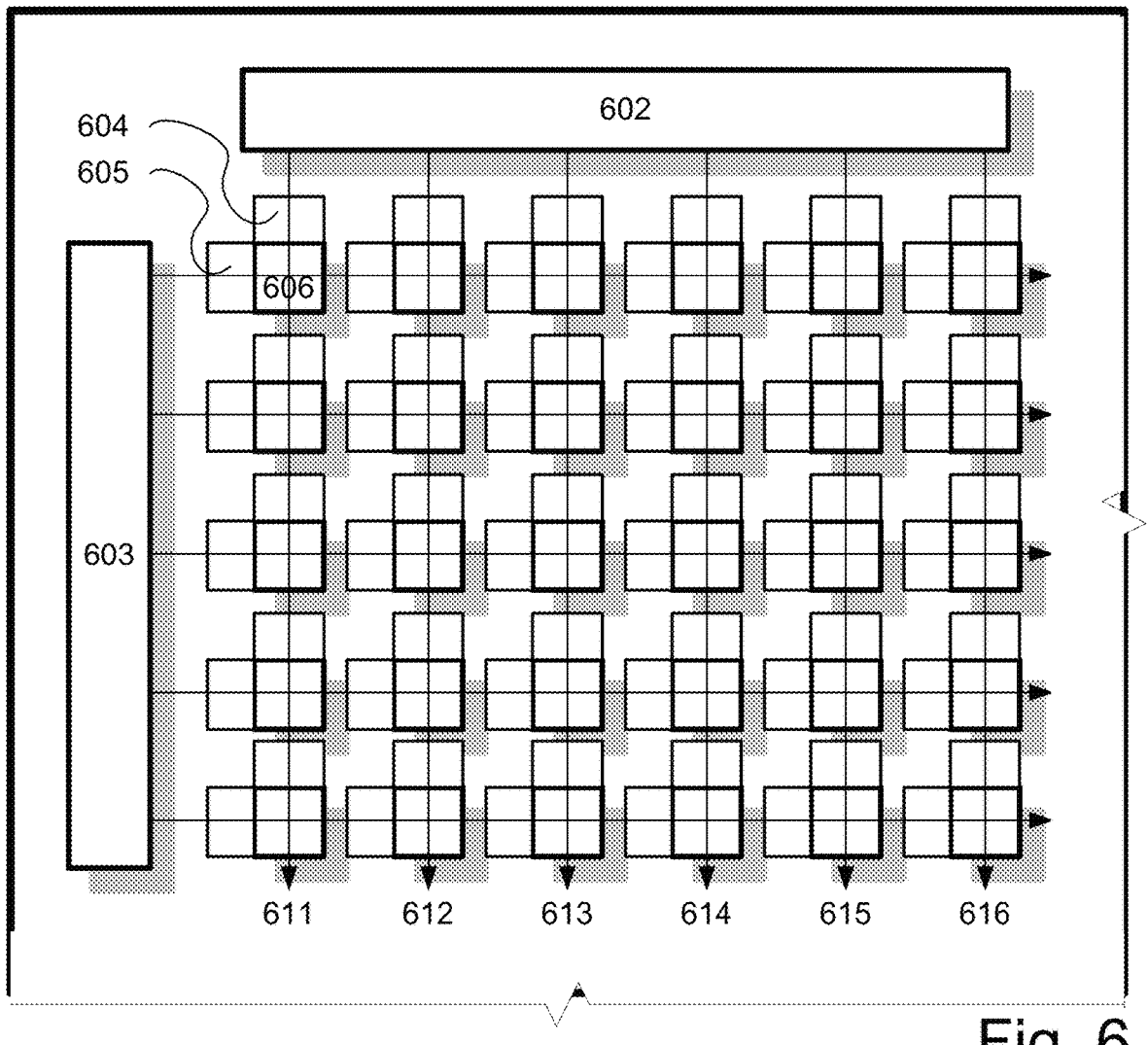
Figure 6A:
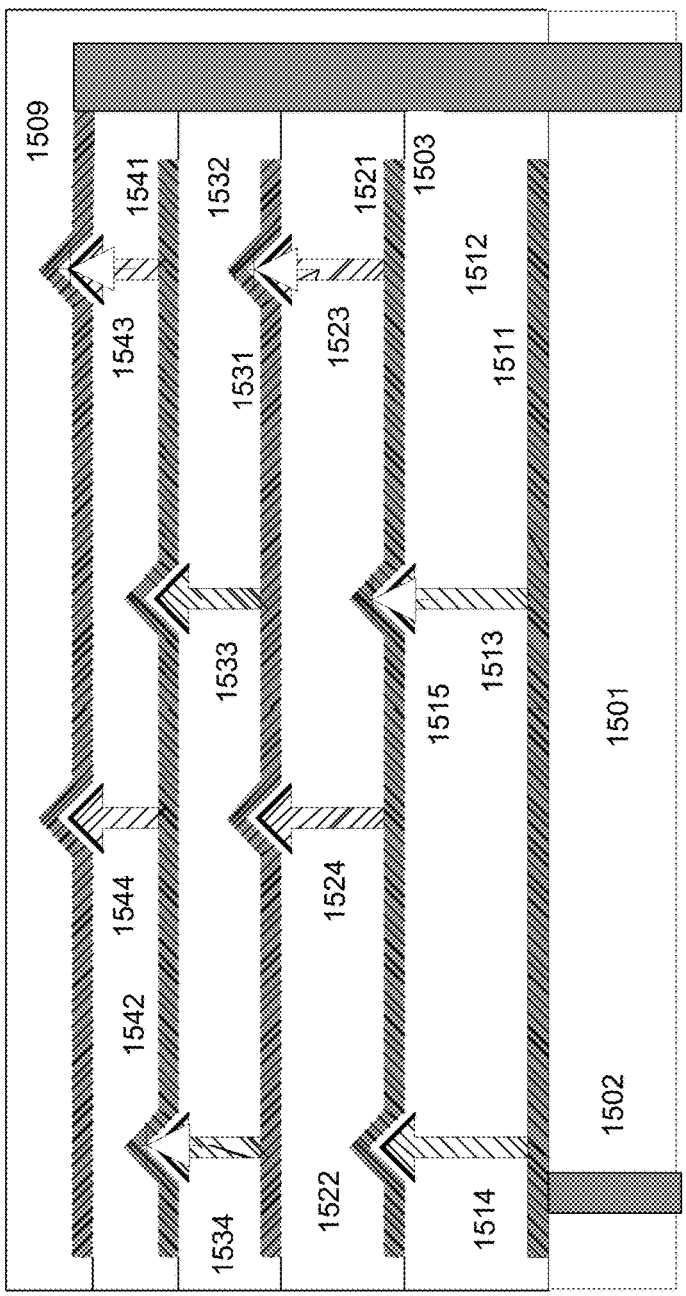

FIG. 6 depicts simplified polarization sensitive focal plane array, antenna or a display. FIG. 6A depicts schematically cross-section of an antenna/rectenna based stratum.

Figure 7:
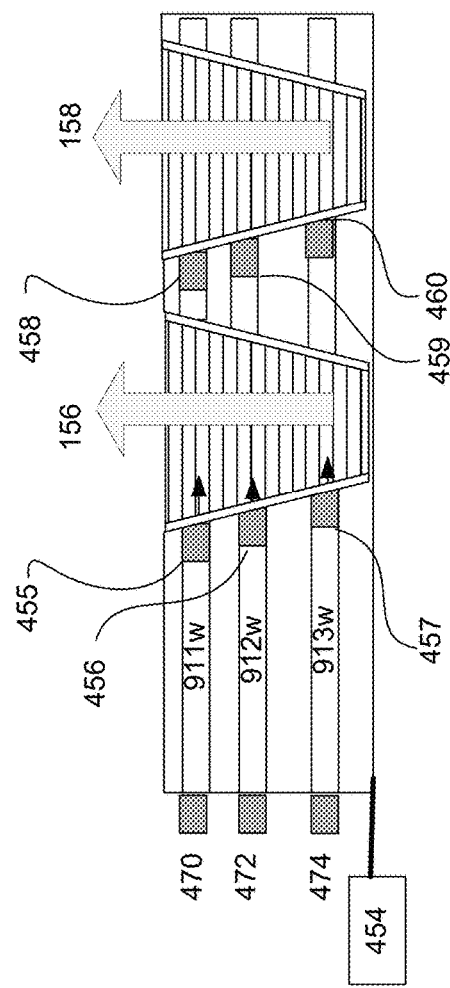

FIG. 7 depicts cross-section of several embodiments of display based on CRT's and lateral waveguides.

Figure 8:
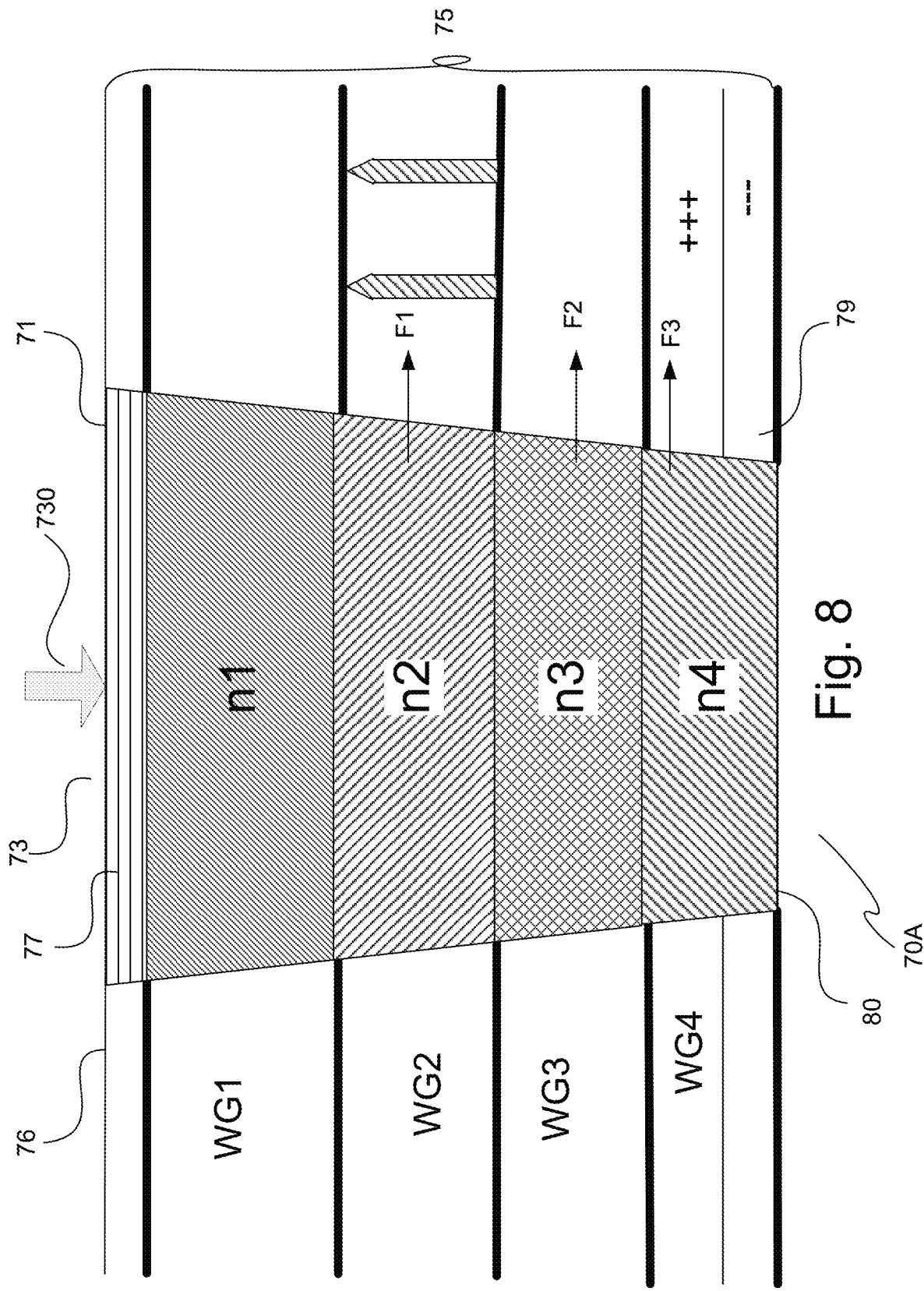
Figure 8A:
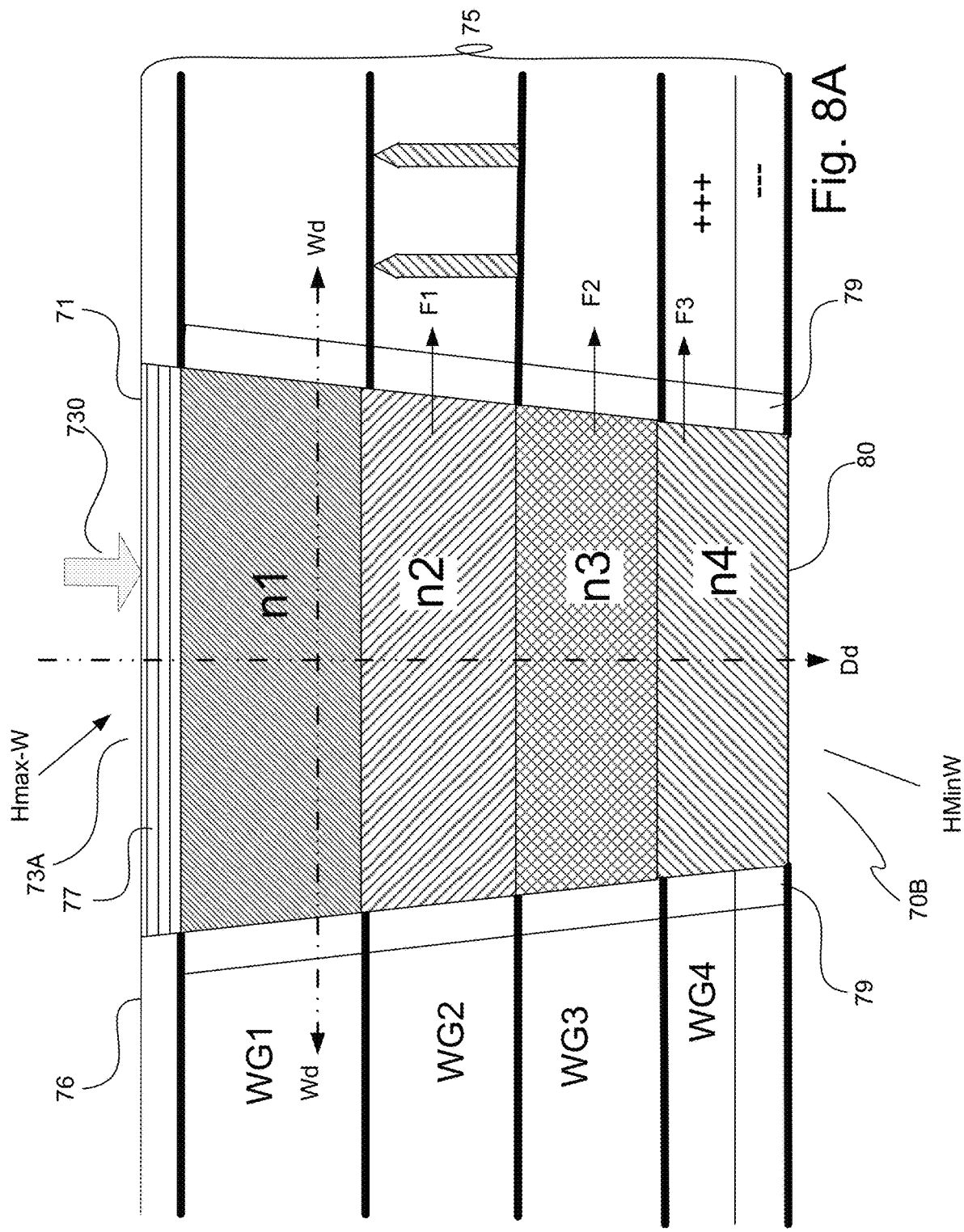

FIG. 8 depicts a cross-section an embodiment of a CT utilizing materials to fill the tapered cavity with increasing refractive index with increased depth. FIG. 8A depicts a CRTR utilizing layered materials to fill the tapered CRTR core with increasing refractive index with increased depth FIG. 8B. depicts a simplified cross-section of a semi-tapered core CRTR or CT disposed in a stratum. FIG. 8C depicts a top view of the core section of such CRTR.

FIG. 9 depicts a cutout of a section of an embodiment using non-absorbent stratum utilized as a spectrum detecting tool.

FIG. 10 depicts a cutout of a section of an embodiment of passive spectrometer for specific material detection. FIG. 10A depicts the bottom of a spectrometer depicted in FIG. 10.

DETAILED DESCRIPTION

Certain figures and embodiments of the invention will be described herein by way of example to increase the understanding of different aspects of the invention.

Figure 1:
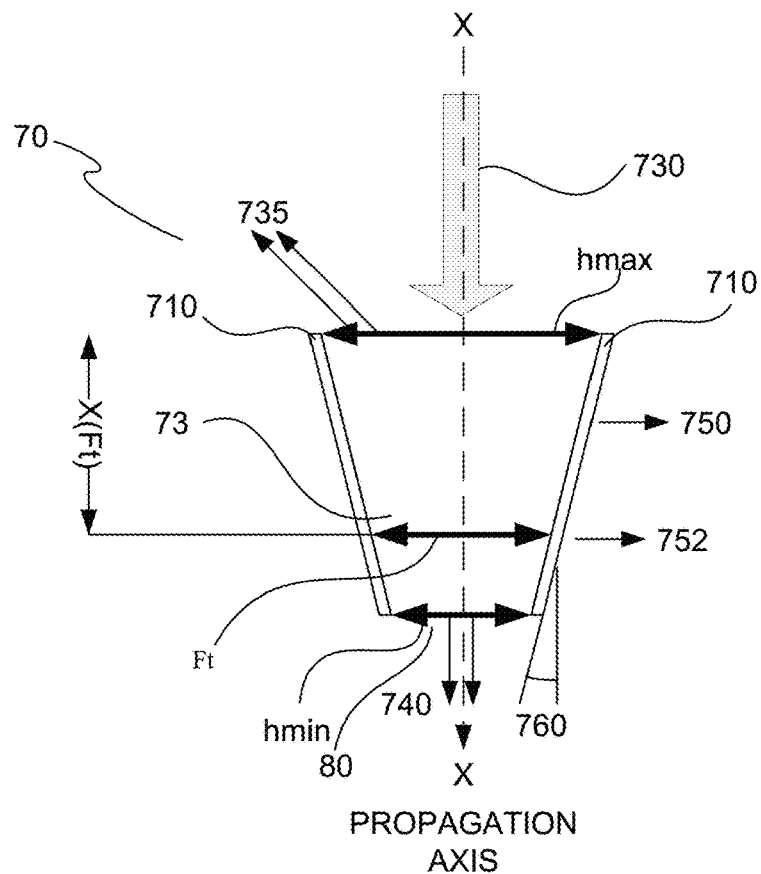
FIG. 1 depicts a cross-section of a simplified conical trap (CT).

FIG. 1 depicts a cutout of a simplified conical trap (CT) 70 which is a cavity 73 having a tapered longitudinal cross section, and is dimensioned as described below. In splitter mode the CT allows a wave in the spectral range of interest to propagate in the cavity until it reaches a cone departure state CDP at a frequency dependent width, which corresponds to a frequency dependent depth due to the core taper. The cavity is dimensioned to allow the wave to propagate therein and to depart it via its peripheral side wall 710. The tapered cavity 73 has a wide end denoted in FIG. 1 as $h_{max}$ defining an aperture, and a narrow end $h_{min}$ referred to in theses specifications as a tip. The cavity is delimited by its side periphery walls 710 which in some embodiments are defined by the stratum in which the CT is embedded. In certain embodiments the wall 710 may comprise a passivation layer disposed within the cavity and defining the cavity boundary. The passivation layer should not be confused with a cladding, as its index of refraction is immaterial, and in most case the dielectric passivation layer is too this to act as a proper cladding containing and guiding waves within the core. The passivation layer is provided to tie any dangling bonds at the edge of surrounding semiconductor material. In these embodiments the cavity may be evacuated in high or low vacuum, alternatively it may be filled with air or by a substance having a lower refractive index than the portion of the stratum immediately surrounding the CT. This is in notable contrast with a common waveguide, where the waveguide core has a higher refractive index than the surrounding cladding. The substance commonly comprises a fluid such as air, other gas or other liquid.

In certain embodiments the CT may be filled with a solid having a lower refractive index than the surrounding stratum. Furthermore, in certain embodiment the CT may be filled with material having a higher refractive index than the surrounding stratum, however such filling material is uniform in at least one width plane of the CT, and thus no cladding is formed about the CT at that level. This is in contrast to a common waveguide where a cladding discontinuity would cause discontinuity is wave guiding. Thus for example the CT may be filled with a plurality of materials types 714, 717, each at different depth. This construction allows the material layer in the CT to better distribute the radiant energy 730 to its components at different depths of the CT. More detailed explanation of an embodiment utilizing one such filling technique is described in relation to FIG. 8. The skilled in the art would realize that the interface between filling layers must be well considered to avoid undesired reflection, and it is important to note that filling the CT, and especially filling the CT with different materials at different depths is an optional embodiment and the cavity 73 requires no filling, and may indeed be evacuated.

At any depth, the cavity 73 has a corresponding plurality of width dimension(s) transverse to the depth dimensions, the width dimensions for a given depth defining a width plane transverse to the depth dimension. The width plane dissects the tapered cavity to form a two dimensional cross-section. Stated differently, the width being any direction lying in plane transverse to the depth directions, i.e. a plane that is penetrated by the depth dimension and is substantially perpendicular thereto. The cavity cross-sections may be of any geometry and form, and may be symmetrical or asymmetrical. By way of example, $h_{max}$ and $h_{min}$ and Ft denote width extending on both sides of the depth dimension X-X, and each is on a different width plane. Notably, while those examples are depicted as having symmetry about the at least two sides of the depth axis, such symmetry is not required, and other width dimensions on the respective planes may or may not be of varying magnitude. However, by virtue of the taper, considering at least two width planes, the plane closer to the aperture will have at least one width dimension having a larger magnitude than at least one width dimension magnitude on the plane that is closer to the tip. While in the example depicted in FIG. 1 the cross-sections are received from a pyramid or a cone with the clipped apex, any desired shape may be selected as long as the width direction is reduced as a function of depth. The CT may continue to taper to a point, or be made as shown, into a frustum. In the depicted example, the taper forms an angle 760 from the vertical. The frequency selectivity of the CT increases as the angle 760 decreases.

Electromagnetic radiant energy admitted via the aperture propagates in the cavity generally along the depth dimension X-X. The depth being an axis which extends indefinitely, and in these specifications increases from the aperture towards the tip, such that larger depth implies greater distance from the aperture.

Energy 730 in the spectral range of interest is incident on the waveguide at its aperture, at an angle which permits energy admission. Waves having a lower frequency than a cutoff frequency $F_{min}$ are reflected 735.

The electromagnetic radiant energy waves 730 admitted via the aperture propagate along the depth dimension X-X until such waves reach a plane of sufficiently constricted cross-section, to cause the wave to depart the cavity, and the location at which the wave departs the cavity becomes the Cone Departure Position, CDP. The width of the CT core which determines the CDP for a wave of a given frequency is termed the 'emission width' for that wave. The distance of an emission width for a specific wave from the aperture, when measured along the depth direction, is referred to as 'emission depth'. Commonly, emission width is at or about half wavelength.

The cavity 73 width is dimensioned such that when multi-frequency energy 730 is admitted through the aperture and propagates along the core depth, it will cause a lower-frequency spectral component to reach a CDP at a first depth 750, and the cavity will further taper to a width that will cause energy of a higher-frequency spectral component to reach a CDP at a second depth 752, the second depth being larger than the first depth. It is seen therefore that the depth X at which a wave t if certain frequency reaches a CDP is a function of the wave frequency, or as shown, X(Ft).

Therefore, for a given CT spectral range of interest $S_i$, ranging between $\lambda_{max}$ to $\lambda_{min}$ which represent respectively the longest and shortest wavelengths of the spectral range of interest as measured in the core material, wherein $\lambda'$ is at least one wavelength in $S_i$, the dimensions of a frequency splitting CT taper are bounded such that a. the aperture size $\psi$ must exceed the size of one half of $\lambda_{max}$;

b. the CT core size must also be reduced at least in one dimension, to at least a size $\zeta$ which is smaller than or equal to one half of wavelength $\lambda'$.

Thus the CT cavity dimensions must meet at least the boundary of $\{\zeta \leq \lambda'/2 < \lambda_{max}/2 \leq \psi\}$ where the CT sizes defined above relate to a size in at least one dimension in a plane normal to the depth dimension. In FIG. 1 the aperture size $\psi = h_{max}$. It is noted however that not all waves in $S_i$ must meet the condition b. above. By way of example, certain waves having shorter wavelengths than $h_{min}/2$ may fall outside the operating range of the CT. Such waves which enter the CT will either be emitted through the tip, reflected back through the aperture, or absorbed by some lose mechanism. Preferably the aperture size $\psi$ is larger than the minimum required size of one half of $\lambda_{max}$.

CT dimensions and characteristics are significantly influenced by the materials it is built of, and the length of the waves traveling therethrough. Thus, by way of example the CT aperture should be at least a half $\lambda_{max}$, the aperture may be of any size between $\lambda_{max}/2$ to $\lambda$, and would commonly be larger. Thus aperture widths at least in one width direction, may be up to 5, 10, and even 100 and more $\lambda$, but in most embodiments are in the order of 1-20$\lambda$. In certain embodiments larger aperture sizes are preferred, for reasons such as extending the CRTR to allow more material between adjacent CRTRs at initial emission depths, provide a different cone of acceptance, or meet other requirements.

The depth of the CT may also vary according to design requirements. By way of example CT increased depth would provide better frequency resolution, but would add cost of manufacturing. However a distinction has to be drawn between CT's and simple cones. The CT is specifically designed and dimensioned to both accept the spectral components below $\lambda_{max}$ and emit those components at varying emission depths based on the narrowing of the tapered cavity, where the resistance to a spectral component departing the CT to the side or the cavity at an emission depth is lower than the resistance to the wave continued propagation along the CT depth, and that the emission depth increases with decreased wavelength. The term 'resistance' in this paragraph should be construed to mean that the local physical conditions dictate that spectral component propagation is more appropriate in a path of less resistance than in a path of higher resistance, and not limited to electrical resistance and the like.

Notably if a third spectral component $\lambda''$ is present, and has a higher frequency than $\lambda'$, it may be emitted at greater depth than $\lambda'$ or be emitted via the tip if the tip is constructed to pass a spectral component of frequency $\lambda''$, or it may reflected or absorbed.

The CT aperture is dimensioned, when operating in splitter mode, to allow the entry of a spectral component having at least the lowest frequency in the spectral range of interest, which means that the longest wavelength in the spectral range of interest for the CT is defined by the aperture width in at least one dimension. Notably, the spectral range of interest may be limited by other considerations to shorter wavelengths. The cavity taper in at least one dimension which must encompass both the emission width of the longest wave in the spectral range of interest as well as an emission width of at least one shorter wavelength within the spectral range of interest. The CT either will taper to less than the emission width of the shortest wave in the spectral range of interest or will allow the final portion of the spectral range of interest to exit vertically at a truncated tip of the core. Larger widths than those emission widths at the aperture, or smaller widths than those emission widths at the tip, are allowed. In certain embodiments the aperture approximately equals $\lambda_{max}$, while in many others in others it is smaller than two or three times $\lambda_{max}$, however aperture sizes as large as $10\lambda_{max}$ or more. An aperture size smaller than 1.5 or $2\lambda_{max}$ is desired for many applications, however when a long propagation path, or longer absorption path is desired, larger apertures, even two or more orders of magnitude of $\lambda_{max}$, may be beneficial. It is however noted that aperture size may also be smaller than $\lambda_{max}$ but larger than $\lambda_{max}/2$.

If the tip is truncated or otherwise allows passage of at least some of the spectral components that were admitted by the aperture, the highest frequency in the spectral range of interest for the CT is defined by the longest wavelength that will be emitted into the stratum via the cavity side wall. If the tip does not allow energy to pass therethrough, the highest frequency in the spectral range of interest for the CT is the highest frequency to be emitted, and detected or reflected by any desired manner.

The spectral range of interest for a CT operated in mixer mode is the range between the highest and lowest frequencies of radiant energy injected into the tapered cavity via the periphery side walls. In hybrid and reflective modes of operation the spectral range of interest for the CT is a combination of the above ranges, as dictated by the application at hand. Notably, all of those spectral ranges of interest are defined for the CT. Portions of the CT or other elements of the invention may have different ranges of interest.

In general terms then, when multi-frequency radiant energy is admitted through the CT aperture, lower-frequency waves will reach their CDP before higher-frequency waves, due to their longer wavelength and the taper of the cavity. As the wave energy departs the CT at its respective CDP, lower-frequency waves would exit the cavity closer to the aperture than higher-frequency wave. Thus, the CT will provide spatially separated spectral components along its outer side walls, while at the same time refracting the spatially separated energy away from the depth axis of the CT.

Figure 1A:
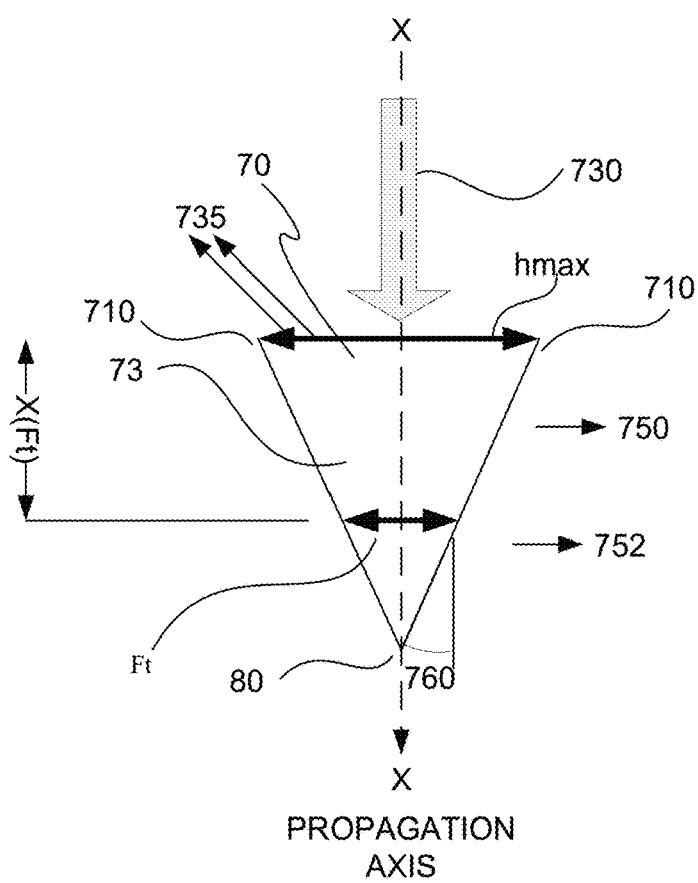
FIG. 1A represents a cross section of a CT tapering to a tip.

The tip may be open in the sense that it does not hinder passage of some radiation therethrough, or closed in the sense that it blocks at least a portion of the spectral range of interest. In embodiments where the tip does not taper to a point, energy 740 may be allowed to exit the tip end of the CT, or a mirror may be formed at the tip, to reflect unwanted energy back through the aperture. FIG. 1A represents a cross section of a CT tapering to a tip.

Figure 2:
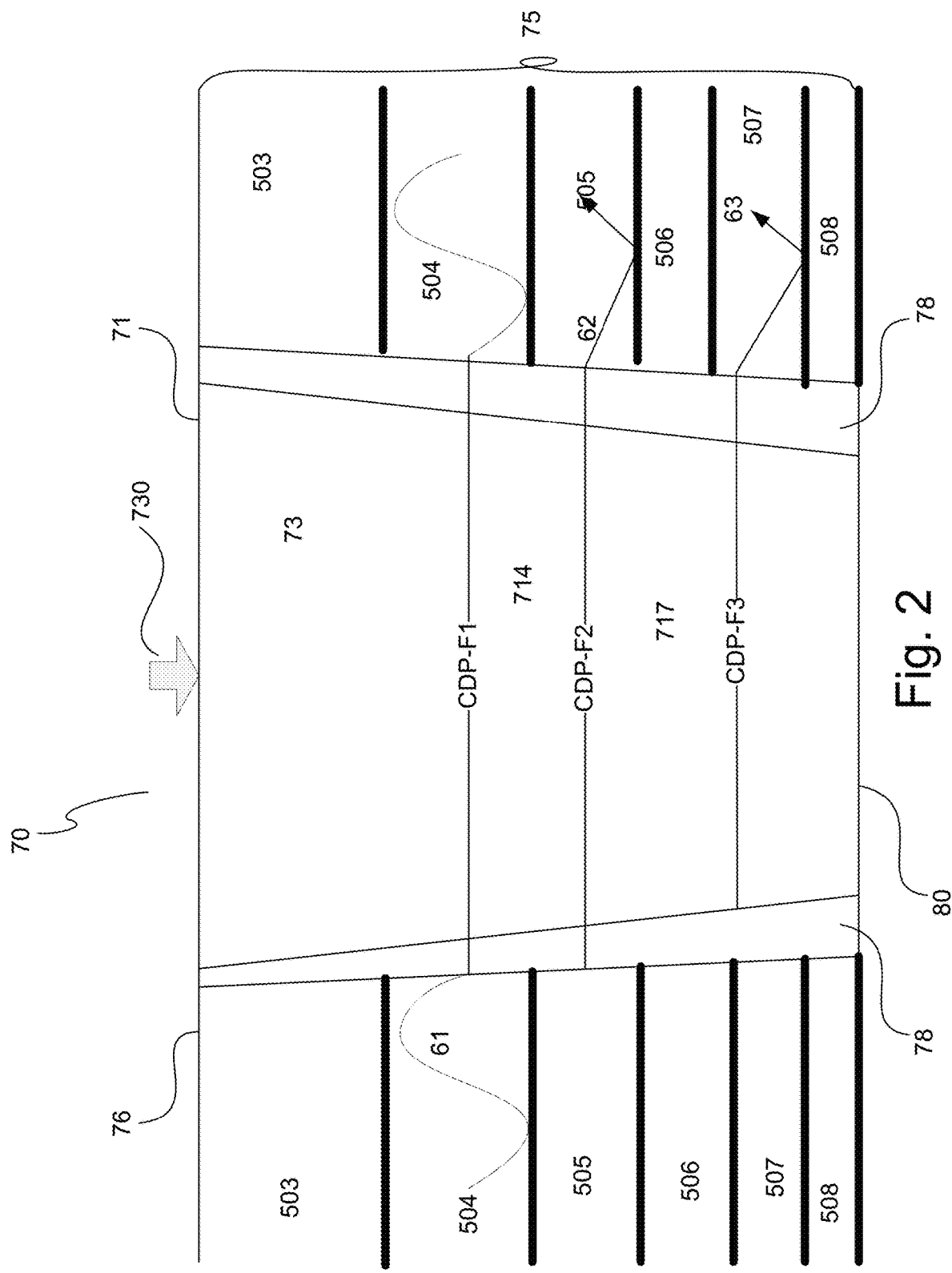
FIG. 2 depicts a cross-section of a simplified CT disposed in a lateral waveguide based stratum.

FIG. 2 depicts a cross-section of a portion of a stratum 75 showing successive superposed lateral waveguides 503-508. The heavy lines between the waveguides represent the cladding and/or conductors which define the depth extents of each lateral waveguide. It is noted that not all layers must have a transducer, or even act as a waveguide. By way of example layer 503 may be a protective layer such as a metal layer to protect underlying waveguides, layer 506 may have no transducer, and the like. Furthermore, as will be seen below, individual waveguide oftentimes differ in thickness, materials, and the like. Waveguides may be delimited by materials of lower refractive index than the respective cores, by metal, and the like, Such layers may comprise for example two or more insulated metal layers, where the top layer interacts with the transducer there-above, and acting as charge carrier collector therefore, an insulation layer, and a lower metal layer which acts as charge carrier and waveguide boundary for the lower waveguide. Metal may be displaced by any material having the desired refractive index and conductivity, such as by highly doped semiconductor, transparent metal, and the like.

The tapered cavity 73 which constitute the conical trap (CT) 20 is embedded in the stratum. The CT aperture 71 may be congruent with the stratum top face 76 or may be disposed under an optional top layer (901 in FIG. 3) In FIG. 2 the CT tip 80 extends through the stratum, however in certain embodiments the stratum may extend further than the CT tip (not shown). The stratum oftentimes also includes a substrate and the CT may extend to the substrate, or extend only to the depth of the lateral waveguides. In certain embodiments, the CT tapers to point. As described above in this embodiment the cavity 73 has lower refractive index than the surrounding material. Notably, embodiments of the invention obviates the need for separate core and metamaterial type cladding, as well as avoids the losses associated with absorption within the cladding of a tapered core waveguide like a CRTR, where the cladding is of lower refractive index than the core.

Optionally a passivation layer 78 is disposed within the cavity along its outer periphery. The passivation layer may be required for certain transducer types, in which atoms or molecules having an unsatisfied valence (colloquially known as dangling bonds) exist on the boundary of layers contacting the CT cavity. Such bonds may cause significant stray currents, and in certain cases even short PN type transducers. Thus for certain transducers passivation is required. A passivation layer may be formed by certain gasses such as hydrogen, oxides, and other compounds, which may be introduced temporarily to change the material characteristics, or may be present within the structure during its operation. If a gas or a liquid is utilized as a passivator, the gas would completely fill the cavity. It is important to differentiate the passivation layer from a cladding—the passivation layer does not confine and guide energy within the cavity, as the cavity often has lower refractive index than the passivation layer, if used. Therefore, the cavity is considered to be in direct contact with the stratum, regardless of the presence of the optional passivation layer. However materials of any desired refractive index may be utilized for the passivation layer. Even when a passivation layer exists between the CT and the stratum, the CT and stratum are considered to be in direct contact, as the passivation layer is considered negligible for wave-guiding of radiant energy and/or for propagation between the CT and the stratum.

FIG. 2 depicts the multi-spectral radiant energy 730 comprising at least three spectral elements F1, F2, and F3, are admitted via the aperture 71. Spectral component F1 having a wavelength $\lambda$ reaches its respective cone departure position at CDP-F1, and departs the CT 70 cavity 73 into lateral waveguide 504, as seen by line 61. Notably, in a stratum where the lateral waveguide guides the energy departing the CT the energy of spectral component F1 is confined in lateral waveguide 504, and if a LE type transducer exists in waveguide 504, the energy is absorbed and converted at least in part to electrical energy. Similarly, spectral component F2 having wavelength $\lambda'$ reaches its CDP at CDP-F2 and the energy departs the CT cavity and is being guided 62 or absorbed in waveguide 505, and spectral component F3 having wavelength $\lambda''$ reaches its CDP at CDP-F3 and being guided 63 or absorbed in waveguide 507, where $\lambda > \lambda' > \lambda''$.

Figure 3:
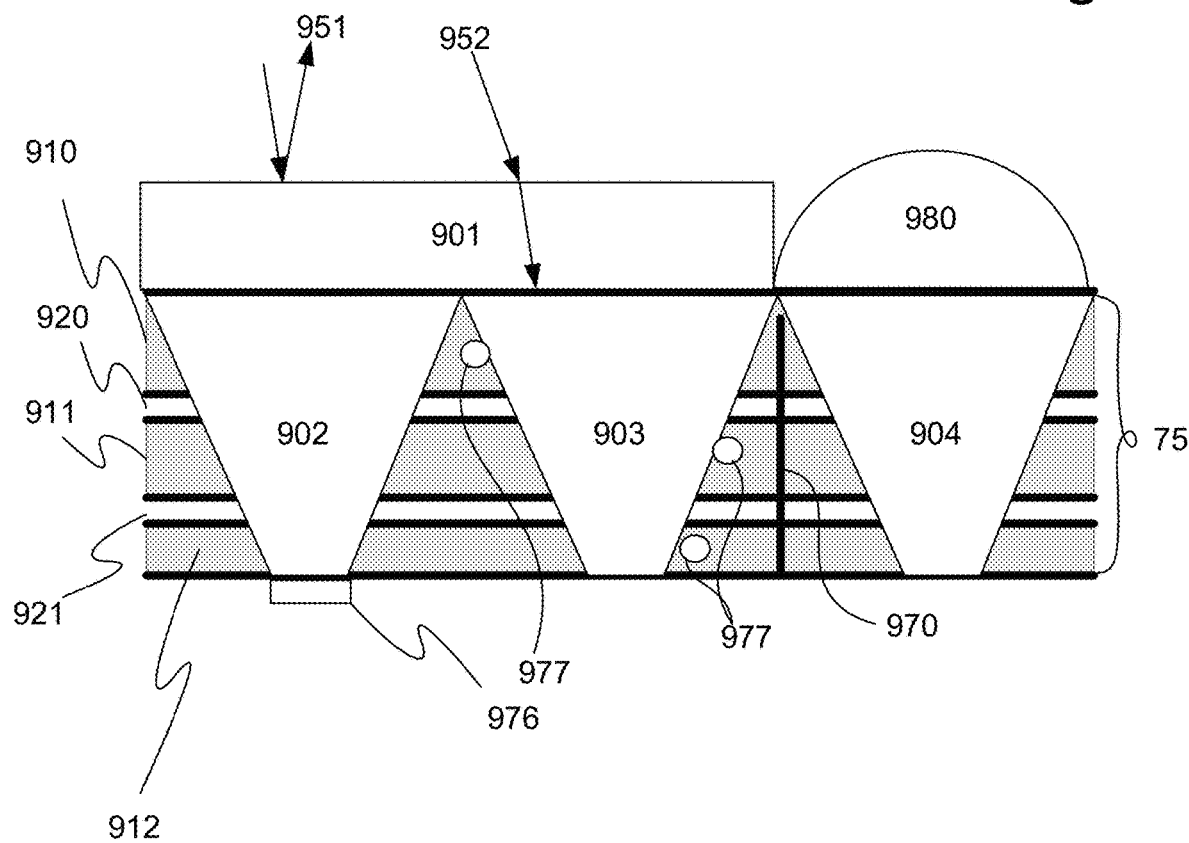
FIG. 3 depicts a cross-section of a CT array in lateral waveguides showing several optional construction details.

FIG. 3 depicts a cross-section of three CT's 902-904 disposed in a stratum 75, and showing several optional features of different aspects of the invention. The stratum is shown comprising three lateral waveguides, 910-912 separated by optional intermediate layers 920-921. Layers 920 and 921 are bounded by the cladding of their adjacent layers. The intermediate layers may provide space for electrical structures such as connections, capacitors, digital readout circuits, sample and hold circuits, and the like. However, as shown elsewhere in the specifications, the intermediate layers are optional.

Stratum 75, and especially the lateral waveguide portion thereof, where transducers are embedded within the waveguides may be manufactured by any convenient method, such as deposition, Molecular Beam Epitaxy (MBE), printing, spinning, bonding, as well as other techniques used in manufacture of multicomponent semiconductor, and combination of such methods. In certain embodiments, spinning of the layers required for the lateral waveguides provides a method of choice, and such method is especially useful for polymeric type transducers. In addition to the common silicon, germanium, and similar common semiconductors, many materials are known for semiconductor transducer construction, such as, by way of example GaSb, GaAs, and InP, ternary semiconductors, such as GaInAs, GaInSb, GaInP, AlGaAs, AlGaSb, AlGaP, AlInAs, AlInSb, AlInP, InAsSb, InAsP, InSbP, GaAsSb, GaAsP, GaSbP, AlAsSb, AlAsP, AlSbP, ZnTeSe, ZnTeS, ZnSeS, CdTeSe, CdTeS, CdSeS, HgTeSe, HgTeS, HgSeS, ZnCdTe, ZnCdSe, ZnCdS, ZnHgTe, ZnHgSe, ZnHgS, CdHgTe, CdHgSe, and CdHgS and quaternary semiconductors, such as GaInAsSb, GaInAsP, GaInSbP, AlGaAsSb, AlGaAsP, AlGaSbP, AlInAsSb, AlInAsP, AlInSbP, ZnCdTeSe, ZnCdTeS, ZnCdSeS, HgCdTeSe, HgCdTeS, HgCdSeS, ZnHgTeSe, ZnHgTeS, and ZnHgSeS. Common dopants are well known for each selected base semiconductor material.

The energy spatially separated by the CT's may be directed to transducers which may be detectors for detection of different frequencies, or to absorbers for harvesting electrical energy, or to RL type transducers, or to any combination thereof. LE type transducers used in detectors may be such as required by way of example in a Focal Plane Array (FPA) for image detection systems. Energy harvesting is commonly done for solar cells, but also include harvesting of low level 'black' energy, such as heat harvesting or recovery from volcanoes, industrial smokestacks, motors, electronic components, and the like. If a specific frequency is reflected back into the CT cavity by a RL transducer or even a simple fixed reflector, it will be emitted via the aperture. In certain embodiments in which CT's act as spectral combiners, the lateral waveguide may have light sources embedded therein. The transducers may be housed within the stratum or outside thereof. In CT acting as combiner embodiments the optional lens 980 would provide wider viewing angles.

The CTs shown in FIG. 3 differ in construction from each other, for illustration purposes only. CT 902 has an excess handler 976 at the tip, to handle energy which had not reached CDP before the tip. This may be a reflector which reflects higher frequencies than the CT can utilize. Alternatively excess handler 976 may be a transducer which is able to absorb and utilize such energy, either as heat or by conversion to electrical energy. CT 903 has specific transducers 977 for differing wavelength disposed about the CT at differing depth, each receiving and converting energy of differing frequency. In some embodiments at least one of the transducers 977 may emit light which is coupled to the CT and in some embodiments at least one of the transducers 977 may be reflective. Different transducers of the transducers 977 may be of differing kinds.

The line 970 represents schematically separation between the CT's. Such separator may be electrical, i.e. an insulator, radiant energy separator, or both. An insulator would allow for separation of areas about each CT or a group of CT's. A radiant energy separator reflects energy from a single CT back towards it allowing better absorption and avoiding cross-talk between different CT based pixels.

Optionally insulators may be disposed between cladding layers of the lateral waveguides. However in the preferred embodiments a conducting layer or grid is utilized to collect charge carriers from the transducers disposed in the waveguide core, or consisting thereof. The conducting layer or grid may be of metal, highly doped semiconductor, and the like. The conducting layer may also act as the lateral waveguide cladding.

An optional reflective layer 901 is also shown. Layer 901 may reflect 951 energy of certain wavelengths coming into the CT's while admitting 952 other wavelengths. In certain embodiments such reflective layer may be utilized to reflect energy back into the CT.

CT 904 is shown with an optional micro-lens 980 constructed above the aperture. Notably such lenses may cover a group of CTs. In certain embodiments, the high pass filter is incorporated into the lens. Use of a lens can modify the angle of acceptance of CT. The apertures of CTs 902, 903, and 904 are contiguous or nearly contiguous at the inlet surface, providing effectively complete collection of incident radiant energy. By making the apertures 960 of the CTs wider than the critical width at the lowest frequency of interest, $F_{MIN}$, all desired frequencies are accepted into the waveguides. A tradeoff exists where the wider the aperture, the narrower the acceptance angular range for any given frequency of light. Managing that tradeoff is an implementation dependent engineering choice.

Figure 4:
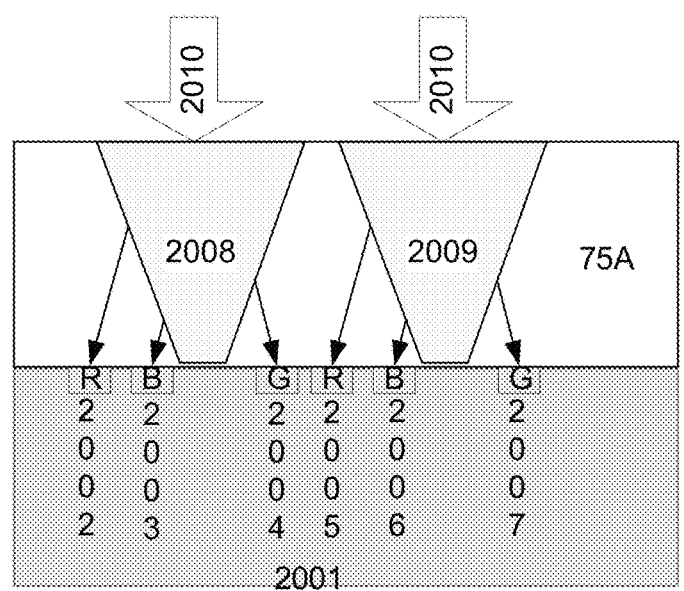
FIG. 4 depicts a cross-section of a plurality of CT's utilizing bulk type, non-absorbent stratum.

FIG. 4 depicts an embodiment utilizing a non-absorbent type stratum 75A which comprises a bulk material in which the spatially sorted energy propagates. In the depicted embodiment, the CTs 2008 and 2009 separate incoming visual light into Red, Green and Blue (RGB) primary colors, and those colors are detected respectively by transducers 2002, 2003, and 2004 for CT 2008, and transducers 2005, 2006, and 2007 for CT 2009. The transducers are shown in a substrate 1200. While this is one alternative construction, the transducers may be located in the stratum, and/or in lateral waveguides, and the selection of the location of the transducers is a matter of technical choice.

While light is utilized in many of the examples disclosed herein, the spectrum of interest may cover any portion of the spectrum.

As noted, CT use may extend to the millimeter wave range (EHF), or even to the lower microwave range. Depending on where between cm waves and micron IR the range of dielectric constants available increases dramatically. By way of example, water has an index of refraction of nearly 10 at radio frequencies but only 1.5 at IR to UV. There are numerous optical materials with low and high index at mm wave frequencies and below. Thus while the principles of operation of CTs are similar, the materials and sizes differ. A millimeter/microwave operated CT is an aspect of the invention which acts as a channelized filter integrated into a horn antenna wherein the channelized ports are lateral to the horn axis and the in-line exit port is a high pass filtered output for a broad band input. Such device may be utilized as a an excellent front end for a multiplexer/diplexer, and as a general purpose antenna that has excellent noise figure and improved anti-jamming as those characteristics are determined at the front en of devices which use them. The small dimensions of the CT based antenna also provides for a compact, potentially multi-frequency antenna, capable of receiving, transmitting, or a combination thereof, by provide a plurality of CT's acting as receiving/transmitting elements in phased array arrangement, where certain CT's are fed a signal at a different phase. Moreover a tightly packed array of CT's is conducive to a powerful, focused beam formation which may also be utilized in a synthetic aperture radar, and the like. Thus an embodiment like the one shown on FIG. 6 may act as either a receiving and/or transmitting antenna, with or without polarization discrimination or combination.

It is noted that radiant energy emitters disposed about the cavity, such as in the stratum by way of example, are able to couple waves into the CT at frequency selective locations, resulting in radiant energy emitted at the aperture of the CT being the combination of radiant energies inserted along the CT peripheral edge. Thus the CT becomes a linear mixer or combiner (the terms mixer and combiner being used interchangeably).

FIG. 5 represent a simple example of a multifaceted symmetrical cavity CT. Using multifaceted cavity such as square, hexagonal, octagonal shapes and the like, provide multi-polarization separation when the CT acts as a spectral splitter and multi-polarization combination when the CT acts as a spectral combiner. FIG. 5 represents a perspective view of one CT where the cavity is pyramid shaped, having a square cross-section. FIG. 5 shows the combination of frequency and polarization detection or mixing. While the CT 1050 operates in splitter mode, radiant energy 1055 is admitted to the CT cavity 1050 via the aperture 1051 and travels along the depth direction towards the tip. The energy is divided between the different transducers groups 1052 (R, G, and B), 1054 (R, G, and B), such that each transducer receives a spectral component separated by polarization as well as by frequency. Thus by way of example, the pair 1052*r* and 1054*r* would each receive a spectral component of a red color, but of differing polarization, and similarly transducers 1052*g* and 1054*g* would receive a spectral component of a green color but with differing polarization, and transducers 1052*b* and 1054*b* will have the same with blue color. Clearly, if desired a single frequency band may be detected by including only a pair of transducers, or polarization only may be detected for a wider range of frequencies by directing the multi-frequency spectral components emitted from varying depths into a single transducer for each polarization.

Asymmetrical tapered core cross-sections operate similar to multifaceted cores, where energy is sorted by polarization according to the shape axes. Not every asymmetrical cross-section would result in usable polarization dependent spectral separation, but generally shapes having a two axes, and especially shapes having symmetry about at least one of the axes, while not necessarily about all axes, will tend to exhibit polarization selectivity. However for brevity it is assumed that when 'multi-faceted symmetry' core is used, unless clear form the context, the term extends to include asymmetrical core shapes that function to provide polarization selectivity.

As the CT was shown to act symmetrically in combiner and splitter modes, the same arrangement would act to mix spectral components of narrow band energy sources, into a broader, multi-frequency radiant energy, where the narrower spectrum sources would be directed towards the cavity and couple thereto at an angle projected on the width plane. In combiner mode, energy is inserted to the CT from the stratum and is outputted via the aperture. Thus if the units marked transducers 1052 and 1054 (R, G, and B, respectively) represent a plurality of light source at different angular locations about the depth dimension of the CT, it would result in polarized light corresponding to the location and frequency of the light sources being emitted from the aperture. An exemplary embodiment of a top view is provided in FIG. 6 where each of the CT's in the CT array 601 have transducers 604, 605. Raw controller 602 and column controller 603 energize the transducers in the individual lines 621-625 and columns 611-616, as required in a matrix fashion as known for regular pixels, either in a display or in a detector such as a focal plane array, and the like.

The same principle of operation may be utilized to combine or separate other portions of the spectrum, such as MWIR, LWIR, EHF, microwave, and the like.

Circular CT apertures offer polarization independent emission from the CT, where the polarization depends only on the radiant energy admitted via the aperture. In combiner mode energy emitted from the aperture will be polarization neutral, and in a CT operating in splitter mode, energy will be emitted from the CT periphery will be polarization neutral. However, CT tapered cores do not require geometrical symmetry, nor a constant width about the depth axis. If desired, cross-sections such as elliptical, rectangular, and other geometries may be used to provide a CT with polarized response, if such is desired.

FIG. 5A depicts perspective of a cutout stratum 75A having a plurality of CT's 70 shaped as elongated wedges cut therein. The top face 76 is shown with wide separation between the CT's however the spacing in most embodiments would provide higher utilization if the CT's are tightly formed relative to each other. This type of CT's may be less expensive to manufacture due to the relatively large aperture.

FIG. 5B depicts several examples of optional cross sections of CT's, as projected on a width plane.

FIG. 6 depicts a simplified diagram of an array of an array that may be utilized as a phased array antenna. In varying embodiments it may also operate as a FPA or a display, with optional polarization emission or detection. A plurality of CT's 606 are arranged in an array. Row controller 603 and column controller 602 are coupled to each of the transducers 604 and 605 coupled to the CT's. If polarization is required the 604 and 605 transducers are angled to each other. If polarization is of no importance, only one transducer per layer is required for each CT. Transducers are layered to provide frequency separation or to optimizer frequency combining.

As CTs may be used well into the EHF range, and even for longer waves, they act as an antenna either for transmission or for reception, as well as for mixing signals. However in the range of visible and UV imaging, the ability for fine control of a very narrow beam of light is utilized in many applications such as semiconductor manufacturing, scanning microscopes, and the like. The added capability of the CT to control multiple polarizations further assists in providing finer control of the beam characteristics, including, by way of example, utilizing interference of differing frequencies and polarizations. Thus the CT based phased array antenna is useful throughout the range of millimeter waves well into the UV range. FIG. 6 represents a top view of such antenna, however the number of elements may of-course be scaled as needed.

A phased array antenna is an antenna composed of a plurality of radiating elements being fed via phase controller which allows changing the phase between different antennas for transmitting antenna, and measuring phase difference between received signals. During transmit operations, beams are formed by shifting the phase of the signal emitted from each radiating element, to provide constructive/destructive interference so as to steer the beams in the desired direction. Phased arrays are common in the radar field, but have applications elsewhere. When mounted on a moving platform phased arrays are often used to form Synthetic Aperture Radar (SAR) which provides high resolution by repeated 'illumination' of a target by pulses and synthetically computing a model of the scanned target.

CTs may be utilized as a general purpose antenna that has excellent noise figure and improved anti-jamming as those characteristics are determined at the front end of receivers. Furthermore, at the microwave/millimeters wave range material selection is dramatically increased. Most materials have frequency dependent dielectric constant, which is high in the IR, EHF, and microwave range, but this dielectric constant drops rapidly at the visual and near IR domains. CT based phased array antennas offer advantages, as described above, in many areas such as communications by narrow beam, designation of a target with visible or invisible light, to photolithography of nanometer sized features.

A receiving CT operating with a plurality of transducers in varying depths forms a channelized filter integrated into a horn antenna wherein the channelized ports are lateral to the horn and the tip exit port is a high pass filtered output for a broad band input. Therefore the CT acts not merely as a side fed horn antenna, but taking the signal from each transducer allows handling of sub-bands separately, reducing noise and increasing antenna merit. Therefore, there is provided a front end for electromagnetic radiant energy receiver, comprising at least one, and preferably a plurality of CT's having a plurality of transducers arranged to receive differing frequency bands. Each of the transducers of a single CT forms a channel of a predetermined frequency band. If a plurality of CTs are used in combination, respective members of the plurality of transducers may be coupled together. In certain embodiments rectenna based converters are utilized within the lateral waveguide of the stratum. The term rectenna relates to an antenna structure having a rectifier integrated with, or closely coupled to, an antenna, such that electromagnetic energy incident on the antenna is rectified and presented as primarily unidirectional (ideally DC) signal. By way of example, rectennas are described in U.S. Pat. No. 7,799,998 In an aspect of the invention at least one transducer disposed within the stratum superposed lateral waveguides comprises a plurality of thin, conducting antenna elements being nearly an integral number of half-wavelengths long. In certain embodiments those antenna elements may be suspended between two dissimilar conductors or semiconductors, affecting rectification of the signal collected by the antennas from the lateral waveguide in which it is disposed. In certain embodiments a point contact diode may be formed by providing an antenna element with a pointed end which is placed in sufficient proximity or in contact with an n type semiconductor coupled to charge carrier collector, optionally embedded with the opposite layer of cladding from which the rectenna extends. As described, such a rectifier/antenna combination are colloquially called rectennas. Several antennas may be electrically coupled to a single rectifier, and the rectifier may be of any desired form.

FIG. 6A depicts a simplified cross-section of a stratum comprising a stacked array of dielectric layers 1512, 1522, 1532, 1542 between conducting layers 1511, 1521, 1531, 1541. Antennas 1513, 1514, 1523, 1524, 1533, 1534, 1543, 1544 are tuned to capture or transmit radiant energy as a resonance of the antennas. Layer thicknesses and antenna dimensions are optimized for a succession of different detection frequencies, to receive the respective radiant energy emitted from the CT at the appropriate depth, or to transmit radiant energy at or close to a level where it will couple to the CT and be emitted via the CT aperture. If rectennas are utilized, at least one connection between each of the conducting elements and the conducting layers forms a rectifying junction 1515. In such case the antenna length may benefit from being shorter to compensate for the impedance change caused by the junction. The arrangement is placed on substrate 1501 with DC electrical contacts 1502 and 1503. Optional passivation layer 1509 at least partially encloses the converter. While rectennas provide a simple and efficient solution providing DC corresponding to the received signal at the rectenna terminals, utilizing non-rectified antennas is also useful and the selection of a the type of antennas, rectennas, and rectification is a matter of technical choice.

In certain aspects of the invention, there is provided an array comprising a plurality of CTs which may be operated as splitters, combiners, reflective, or hybrid CTs. The array comprising a stratum having a plurality of pits formed therein, the pits being defined by pit walls, at least some of the pits being dimensioned to act as the cavity of a CT.

Lately, stereoscopic displays appear in many devices. Such displays provide an illusion of three dimensional objects and are colloquially known as "3D displays", or 3 dimensional displays. It is noted that those devices are not truly three dimensional, but create the three dimensional illusion at the viewer's brain. The skilled in the art would recognize that the CTs in general, and most specifically CTs acting as mixers, will offer significant advantages to regular displays as well as to three dimensional displays. For two dimensional displays the CT offer unique advantages in the field of micro displays, such as wearable displays and the like. For stereoscopic displays the CT offers the advantage of allowing two separate signals to be emitted, each with its own polarization. A plurality of CTs operating in mixer mode, in combinations with respective plurality of controllable light sources will create a display. If the light sources are disposed to provide polarization information a 3D display is formed. 3D display of this type will be very compact and present multiple advantage over the present complex construction. In both 2D and 3D embodiments, the display will provide high efficiency and very small pixel size. Furthermore, the stacked nature of the lateral guides offers simplified wiring as the space between the lateral waveguides may be utilized for wiring each individual layer.

FIG. 7 depicts an optional embodiment of a CT array disposed in a lateral waveguide stratum where the transducers 455-457 are of a gate type. Light sources 470, 472, 474 inject light or other radiant frequency into respective lateral waveguides 911w-913w. By opening or closing the gate type transducers the energy is injected into the CT. Thus a small number of radiant energy sources may be utilized to provide energy emission 156, 158 from a plurality of CT's. It is noted that even without the gate type transducers, a single light source may be utilized to redirect and emit light from all available CT's. Such construct provides multi-spectral light being emitted from each CT, such that all colors emanate from the aperture without requiring separate pixels to each color. Gate type transducers may be by way of example made from liquid crystal or micro mirrors.

Yet another embodiment provides a trans-reflective display. By controlling the gate type transducers 458-460, light entering the CT is controllably reflected thereto and emanates as partial spectrum 158. The reminder of the light is absorbed within the respective waveguides. In such embodiments there is no need for the sources 470-474. All displays are of-course controlled by a controller 454.

FIG. 8 depicts schematically an aspect of the invention providing a CT which further comprises a plurality of layers of fill material filling the tapered cavity. FIG. 2 described the capacity to fill the tapered cavity with layered materials, however FIG. 8 provides a special selection of the fill materials having increasing refractive index. Such CT will be related to as a progressively-filled CT and is generally shown in FIG. 8. The CT 70A is shown embedded in an absorbing stratum 75 comprising a plurality of superposed lateral waveguides WG1-WG4, which may contain transducers as shown by way of example for WG4 by the '+++' and '−−−' symbols representing a PN junction, or rectenna type transducers as shown schematically in one side of the WG2 waveguide, however any type stratum or transducer configuration may be utilized. The CT cavity is filled at least in parts with layers of materials having differing refractive indexes. The refractive indexes are increasing with depth within the tapered cavity. Thus in FIG. 8, the refractive index of layer n4 is higher than the refractive index of n3, which is in turn higher than n2, and so forth (n4>n3>n2>n1). The structure allows radiant energy 730 to penetrate the successive layers n1-n4 from the aperture 71, however when a wave passes the interface between successive layers it is prevented from returning back to the upper layer by the interface of the two layers because of the lower refractive index of the upper layer. On the other hand as was shown above, the lowering width of the tapered cavity impedes wave propagation deeper into the cavity when the cavity width is smaller than a half the wavelength, and the wave tends to depart CT at cavity widths slightly larger than $\lambda/2$. Thus when two radiant energy waves, F1 and F2, F1 having lower frequency than F2, are admitted to the CT through the aperture 71, and assuming that F1 will reach emission depth width and CDP within layer n2, at least a large portion of the wave energy would be emitted from the CT towards lateral waveguide WG2, while if F2 frequency is sufficiently high it would reach the layer N3, and meet a emission depth and CDP within N3, at least a large portion of F2 would be emitted towards waveguide WG3.

Optionally an antireflective coating 77 may be disposed on top of the layers filling the tapered cavity in order to enable the top layer to act similarly to lower layers for energy of frequencies within its depth range. Further optionally Gradient Index (GRIN) technology and techniques may also be utilized to select materials and fill the cavity.

It is also noted that the concepts of progressively-filled CT may benefit CRTR (Continuous Resonant Trap Refractor) which is a tapered core waveguides. CRTRs have a cladding surrounding a tapered core, as opposed to a CT where the cavity is substantially in direct contact with the stratum. Therefore an aspect of the invention provides a progressively-filled RTR with core having a plurality of refractive index discontinuities transverse to the depth within the core. The refractive index discontinuities are arranged such that at the material on the side of the discontinuity closer to the aperture having a lower refractive index than the material on the other side of the discontinuity further from the aperture. Stated in more detail such CRTR is a tapered core waveguide 70B comprising a tapered core 73A having a first end HmaxW and a second end HminW, the first end defining an aperture 71, and the second end referred to as a tip 80, the core having a depth direction Dd extending between the aperture and the tip, wherein the depth magnitude increases with distance from the aperture towards the tip, as indicated generally by the arrow on the direction line Dd. The core has at least one width dimension at each depth, on a plane transverse to the depth direction, the width generally indicated by direction line Wd, the width extends in at least one direction transverse to the depth direction, the core width decreasing in magnitude in at least one direction, as a function of the depth such that the width magnitude at the aperture is higher than the width magnitude at the tip. The core comprising a plurality of core layers n1, n2, n3, n4 . . . nx (where x is any selected integer). At least one layer has a refractive index higher than the refractive index of an adjacent layer disposed at a lower depth. Stated differently layer n4 has a higher refractive index than layer n3. A cladding 79 is disposed at least partially around the core. The first end of the core is dimensioned to allow passage of radiant energy comprising at least a first and a second spectral components F1, F2, F3 . . . Fy (y being any selected integer), each having a frequency associated therewith, wherein the first spectral component F1 has a lower frequency than the second spectral component F2, and wherein the varying width of the core resulting in the first and the second spectral components reaching a state at which they will penetrate the cladding and exit the waveguide via the cladding, at a respective first and second depths, wherein the first depth is less than the second depth.

It is noted that the core layers do not have to be homogeneous and may be composed of a plurality of materials however the layer refractive index is considered the equivalent refractive index of the layer components in accordance with known calculations. Gradient index core layers are also considered.

The CRTR is commonly disposed in an absorbent or a non-absorbent stratum. If an absorbent stratum is utilized adjustments of the height of the stratum layers may be required to compensate for beam bending at the interface between the core fill materials and the cladding, as well as between the cladding and the stratum.

Another aspect of the invention, referred to as semi-tapering core, utilizes a CRTR core which is substantially non-tapered on one side of the cavity or the core and tapering at an opposite side of the core. Such construction may be utilized to accommodate differing spectral components separation needs. FIG. 8B represents an example of such construct utilizing progressively filled CRTR core 73B which uses nonsymmetrical taper about the depth direction. As seen the core tapers only on the left side of the core and is substantially straight on the right side. FIG. 8C depicts a top view of one such CRTR having a cut circle profile, however other profiles may be utilized such as a wedge, and the like. The working of such CRTR are similar to the CRTR depicted in FIG. 8A except for the core geometry. It is noted that similar geometry may be applied to CRTR's of either progressively-filled core or a single refractive index core.

Yet another aspect of the invention is a CT utilizing a similar semi-tapering cavity geometry as the semi-tapering core of the CRTR described in FIGS. 8B and 8C. Similar to the CRTR such CT may be a simple cavity, or progressively filled. As described supra the primary difference between the CT and a CRTR is the cladding 79, and disregarding the cladding in FIGS. 8A-C would provide drawings of CT's of similar construction.

All of the above described CT's and CRTRs may be embedded in either an absorbent or a non-absorbent stratum.

The value of the CT and/or progressively-filled CRTR in a stratum extends far beyond the fields of imaging, display, solar energy, and otherwise interconverting radiant and electrical energy. Different aspects of the present invention are shown in FIGS. 9, 10, and 10A are directed towards some additional advantageous devices utilizing CT's and/or CRTR's in a non-absorbent stratum, applied towards powered and passive spectroscopy by way of example of such uses.

In FIG. 9, a CT 70 is shown embedded in non-absorbent stratum 75A. The top surface of the stratum at least selectively blocks light. A detector array 30 is disposed opposite the top face 76. As light enters the CT cavity 73 it is refracted at different depths in accordance with its frequency. Filling the cavity 73 with material having different refractive indexes would alter the depth, and/or the trajectory of various spectral components 9A-E of the light. The different light patterns are detected by the individual detectors of the detector array 82. Thus if the cavity 93 is filled with material under test, an analysis may be carried out as to characteristics of the material under test, and comparisons to known patterns may be utilized to identify the material under test. It is noted that the sample may be disposed outside the CT or the CRTR and in front of the aperture.

FIG. 10 depicts yet another advantageous implementation utilizing a CT's or CRTR's for passive, spectroscopy type, material identification. Therefore in another aspect of the invention a non-absorbent stratum 75D is provided. The stratum has a top surface 76T and a bottom surface 76B. FIG. 10B shows an exemplary view of the bottom surface. The bottom surface of the stratum is coated with a predetermined pattern of masks 84 capable of blocking light, at least partially. At least one, but commonly a plurality, of CT's 70 are provided such that their aperture is near to, or congruent with, the top surface 76T and their depth extends towards the bottom surface 76B. When a multispectral light L is directed at the CT aperture 71, the CT would act to spatially separate different spectral components and the trajectory of several such components is denoted as 10A-G. If a sample of material is placed in the CT the trajectories would change in accordance with the refractive index of the material under test. As the spectral component trajectories would change their point of contact with the bottom surface 76B. By judicious placement of the masks 84 certain light components would be blocked. The light patterns from a circular cross-section CT would tend to form a plurality of concentric circles, shining through the bottom masks, as seen for example in FIG. 10A. When the CT is empty, one set of colors would be blocked by the bottom masks 84, and thus the bottom of the stratum would appear as having a single color. If however a test sample is placed in the stratum, the different trajectories would cause other colors to hit the masks and different colors to be emitted from the spaces between the masks, giving the stratum bottom a different color. As the change of the trajectories is dependent of the refractive index of the material under test, such device would be able to provide a simple indication of the likelihood of certain substances.

Notably CRTRs may also be used if the refractive index of the material under test is higher that the refractive index of the CRTR cladding. Alternatively, in certain embodiments a CRTR may be used if a space is provided to place the material under test in front CRTR aperture.

By way of example the device 10CC may be implemented as a card type device, having a plurality of CT's on its top surface. A plurality of CT's 70 are also provided and their apertures 71 are near the top surface 76T of the stratum. The top surface 76 which is made to allow transmittance of light into the stratum 75D, only via a Ct or CRTR apertures. The bottom of the device 10CC has a mask 84 disposed in a pattern thereupon. Optionally a color or a pattern legend is provided on the bottom surface. In use, a sample of the material under test is spread or otherwise applied to fill the CT cavities 73, and a multi-spectral light is directed towards the top surface. In certain embodiments such light would be from a source of known spectral characteristics. The color of the bottom surface, and optionally certain patterns, may be observed on the bottom and optionally compared to a known sample. By way of example the mask may be disposed as known pattern such as letters or symbols, or geometrical shapes that would only receive light when a material having certain spectral characteristics is disposed within the CT's at the top surface. Alternatively such lights and patterns may be darkened. Certain mask areas may be used which are transparent to light of one color while blocking other colors. The number of pattern combinations and/or color combination is a matter of technical choice.

Notably in certain implementations depending in the problem at hand, the material under test, and the material to be detected, CRTR's may be used instead of CT's in device 10CC, if the sample may be disposed in front of the CRTR aperture. CT's would act similarly if the material under test is prevented from filling the CT cavity.

As different aspects and embodiments of the present invention are applicable to many roles, applications, and functions, and as the structures at the base of the invention cover a broad spectrum of electromagnetic radiation, it is recognized that different disciplines often use different terms for items that would represent similar concepts in differing fields. This broad applicability points for a need to use words that depart somewhat from the strict common usage in a specific field, yet such terms are either be well defined in the specifications, or will be clear to the skilled in the art by analogy, and in light of the teachings provided hereinabove. By way of example these specifications uses terms such as electromagnetic radiation and radiant energy interchangeably. Similarly, the term 'refractor' and 'splitter' or 'spectral splitter' will be used interchangeably, as well as 'mixer' and 'combiner'. Certain expressions, such as for example the term 'refractor' denotes a device which imparts an angle change to radiant energy, regardless of specific mechanisms, whether they relate to light or to any other part of the spectrum, and regardless of the specific mechanism utilized to impart that angle change. The term 'polychromatic', 'multi-frequency' and 'mixed frequency' are also be used interchangeably, and denote an electromagnetic energy which comprises a plurality of spectral components. The electromagnetic energy components may be spectral components, i.e., components of different frequencies. Alternatively or additionally, the electromagnetic wave components may be of different polarizations, whether or not of differing frequencies. Notably, the terms extend throughout the spectral range of interest.

The skilled in the art would also understand that the number of CT's or CRTR's are depicted in the drawings is merely for facilitating understanding of the invention and commonly larger numbers of CT's and/or CRTRs, alone or in combination, of any of the types disclosed herein and/or in the incorporated applications may be utilized in a single embodiment or apparatus utilizing the present invention.

The term "tapering" and "taper" should be construed that the taper may have different widths at different locations, or stated differently, that the width of the core in at least one direction, changes as a function of depth. The term taper denotes more than a purely linear taper, i.e. a straight line connecting two points on the base and tip as seen in a cone. For example, in some embodiments, the cavity width monotonically decreases as one proceeds from a wider base to a narrower tip, while in other embodiments other functions may be utilized such as stepped function, logarithmic function, or any other desired function. Furthermore, the width may vary to different extent within a single depth. The term substantially implies that the associated condition or limitation is fulfilled within tolerances which permit operation as described. By way of example, while a certain component may be described as transverse, or being at 90 degrees to another, the skilled in the art would recognize that certain tolerance exists and that as long as the purpose of the limitation is served within such tolerance, the component or limitation is considered fulfilled. The term coupled denote connection between two entities however such connection is not mandated to be direct, and two entities may be coupled via an intermediate entity.

In these specifications reference is often made to the accompanying drawings which form a part of the disclosure, and in which are shown by way of illustration and not of limitation, exemplary implementations and embodiments. Further, it should be noted that while the description provides various exemplary embodiments, as described below and as illustrated in the drawings, this disclosure is not limited to the implementations described and illustrated herein, but can extend to other embodiments as would be known or as would become known to those skilled in the art. Reference in the specification to "one embodiment", "this embodiment", "these embodiments", "several embodiments", "selected embodiments" or "some embodiments" means that a particular feature, structure, or characteristic described in connection with the embodiment(s) may be included in one or more implementations, and the appearances of these phrases in various places in the specification are not necessarily all referring to the same embodiment(s). Additionally, in the description, numerous specific details are set forth in order to provide a thorough disclosure, guidance and/or to facilitate understanding of the invention or features thereof. However, it will be apparent to one of ordinary skill in the art that these specific details may not all be needed in each implementation. In certain embodiments, well-known structures, and materials, have not been described in detail, and/or may be illustrated schematically or in block diagram form, so as to not unnecessarily obscure the disclosure.

For clarity the directional terms such as 'up', 'down', 'left', 'right', and descriptive terms such as 'upper' and 'lower', 'top', 'bottom', 'above', 'below', 'sideways', 'inward', 'outward', and the like, are applied according to their ordinary and customary meaning, to describe relative disposition, locations, and orientations of various components. When relating to the drawings, such directional and descriptive terms and words relate to the drawings to which reference is made. Notably, the relative positions are descriptive and relative to the described orientation at hand and modifying the orientation would not change the disclosed relative structure.

Note, however, that use of the foregoing and similar terms of art should not be construed as necessarily limiting all embodiments to modes of operation suggested by the strict technical senses of the terms employed. The novel nature of the invention necessitate certain lexicographical freedoms to describe a structure and limitations. The skilled in the art would readily recognize the proper application of these specifications when taken as a whole, and in light of common knowledge and the state of the art. Various modes of the invention will become apparent in light of these specifications, and all such variations in which these terms are used should be considered within the scope of the invention.

As the human eye is capable of directly sensing and differentiating between light of different frequencies, the visual range was used oftentimes to explain the operation of different aspects of the invention for the sake of brevity and increased clarity, however the spectral range of interest to which the invention relate may differ, be larger or smaller, and depends on the application at hand. With changes in dimensions, materials and the like, the principle described herein extend to any electromagnetic radiant energy and thus the all or portions of the spectrum ranging from the high microwave range of $10^{10}$ Hz, inkling the EHF range and extending to UV should be considered equivalent, unless otherwise specified or clear from the context.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

I claim:

1. A spectral splitter for spatially separating multispectral radiant energy into at least two spectral components thereof, the splitter comprising:
   a stratum having a top face, a bottom face and a thickness;
   at least one tapered cavity formed in the stratum and delimited by side periphery walls formed therewith, the cavity having a first end and a second end, the first end defining an aperture substantially parallel and/or congruent with the stratum face;

the cavity having a depth direction extending between the first end and the second end, wherein the depth magnitude increases with distance from the first end towards the second end;

the cavity further having a width dimension in at least one direction substantially transverse to the depth direction, the cavity width monotonically decreasing in magnitude in at least one direction, as a function of the depth such that the width magnitude at the aperture is higher than the width magnitude at the second end;

the aperture being dimensioned to allow passage of radiant energy comprising at least a first and a second spectral components each having a frequency associated therewith, wherein the first spectral component has a lower frequency than the second spectral component;

such that the cavity periphery side walls being exposed to a solid, fluid or a vacuum in the cavity, and that varying width of the cavity resulting in the first and the second spectral components each reaching a cavity departure position (CDP) at which they will be emitted from the tapered cavity into the stratum at a respective first and second depth, wherein the first depth magnitude is less than the second depth magnitude.

2. A spectral splitter as claimed in claim 1, wherein the cavity is in direct contact with the stratum.

3. A spectral splitter as claimed in claim 1, wherein the cavity is separated from the stratum by a thin passivation layer sufficient to neutralize dangling atomic or molecular bonds within the stratum.

4. A spectral splitter as claimed in claim 1, wherein the cavity is filled with material having lower refractive index than its surrounding stratum, or a lower refractive index than a passivation layer disposed between cavity and the stratum, or a lower refractive index than both the surrounding stratum and the passivation layer.

5. A spectral splitter as claimed in claim 1 wherein the tapered cavity exhibits a generally round cross-section on at least one width plane transverse to its depth direction.

6. A spectral splitter as claimed in claim 1, wherein the tapered cavity exhibits a generally square cross-section on at least one width plane transverse to its depth direction.

7. A spectral splitter as claimed in claim 1, wherein the second end of the cavity tapers to a point.

8. A spectral splitter as claimed in claim 1, wherein the depth of the tapered cavity extends from the top face to the bottom face.

9. A spectral splitter as claimed in claim 8 wherein the tapered cavity having a frustum cross-section when viewed along the depth dimension.

10. A spectral splitter as claimed in claim 1 wherein the tapered cavity exhibits a cross-section on at least one width plane transverse to its depth direction, the cross-section selected from an ellipse or a rectangle.

11. A spectral splitter as claimed in claim 1, wherein the tapered cavity is under vacuum.

12. A spectral splitter as claimed in claim 1 wherein the stratum comprises a plurality of transducers embedded therein.

13. A spectral splitter as claimed in claim 1, further comprising at least one radiant energy to electricity transducers disposed within the stratum.

14. A spectral splitter as claimed in claim 13 further comprising at least one electricity to radiant energy transducer disposed within the stratum.

15. A spectral splitter as claimed in claim 13 further comprising at least one reflective transducer disposed within the stratum.

16. A spectral splitter as claimed in claim 1, wherein the stratum is a non-absorbent stratum.

17. A spectral splitter as claimed in claim 16 wherein the bottom face of the stratum is masked to form a pattern blocking or permitting exit of selected spectral components therethrough.

18. A spectral splitter as claimed in claim 1 wherein the tapered cavity forms an elongated wedge having an apex disposed away from the top face.

19. A spectral splitter as claimed in claim 1 wherein the cavity is at least partially filled with layers of fill materials, at least one layer having a refractive index larger than the refractive index of an adjacent layer closer to the aperture.

20. A spectral splitter as claimed in claim 1, wherein the tapered cavity is a semi-tapering cavity.

* * * * *